(12) United States Patent
Sugimoto et al.

(10) Patent No.: US 11,314,752 B2
(45) Date of Patent: Apr. 26, 2022

(54) COMPUTER SYSTEM AND DATA ANALYSIS METHOD

(71) Applicant: HITACHI, LTD., Tokyo (JP)

(72) Inventors: Ken Sugimoto, Tokyo (JP); Yoshiki Matsuura, Tokyo (JP); Kei Tanimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 383 days.

(21) Appl. No.: 16/495,761

(22) PCT Filed: Apr. 18, 2018

(86) PCT No.: PCT/JP2018/015983
§ 371 (c)(1),
(2) Date: Sep. 19, 2019

(87) PCT Pub. No.: WO2018/225389
PCT Pub. Date: Dec. 13, 2018

(65) Prior Publication Data
US 2020/0110747 A1 Apr. 9, 2020

(30) Foreign Application Priority Data
Jun. 6, 2017 (JP) .............................. JP2017-111514

(51) Int. Cl.
*G06F 16/00* (2019.01)
*G06F 16/2458* (2019.01)
*G06F 9/50* (2006.01)

(52) U.S. Cl.
CPC ........ *G06F 16/2465* (2019.01); *G06F 9/5083* (2013.01)

(58) Field of Classification Search
None
See application file for complete search history.

(56) References Cited

U.S. PATENT DOCUMENTS

| | | | |
|---|---|---|---|
| 6,965,895 B2 * | 11/2005 | Smith | ................. G06F 16/2465 |
| 10,705,913 B2 * | 7/2020 | Mitkar | ................. G06F 11/1451 |

(Continued)

FOREIGN PATENT DOCUMENTS

| | | |
|---|---|---|
| JP | 2014-112385 A | 6/2014 |
| JP | 2016-71837 A | 5/2016 |

(Continued)

OTHER PUBLICATIONS

Toward Scalable Systems for Big Data Analytics: A Technology Tutorial, Hu et al., IEEE (Year: 2014).*

(Continued)

*Primary Examiner* — Jean M Corrielus
(74) *Attorney, Agent, or Firm* — Volpe Koenig

(57) ABSTRACT

A computer system includes a first computer and a second computer. The second computer includes, a minimum analysis dataset in which a data item serving as an analysis target and a repetition unit are defined in advance for each analysis target and an agent. The agent receives an analysis target data fetching designation including the minimum analysis dataset, a repetition range of repeating acquisition of data, and a repetition unit. The agent generates a first process that acquires data from the first computer and a first instance that executes processing within the first process on the basis of the repetition range and the repetition unit and activate the first instance to acquire the accumulated data from the first computer. When the processing of the first instance is completed, the agent generates a second process that executes analysis processing and a second instance that executes processing within the second process.

8 Claims, 22 Drawing Sheets

(56) References Cited

U.S. PATENT DOCUMENTS

| | | | |
|---|---|---|---|
| 10,949,382 B2 * | 3/2021 | Hammer | G06F 16/13 |
| 2004/0193807 A1 * | 9/2004 | Mogi | G06F 16/20 |
| | | | 711/137 |
| 2005/0131893 A1 * | 6/2005 | Von Glan | G06F 16/24532 |
| | | | 707/999.005 |
| 2015/0134919 A1 * | 5/2015 | Murata | G06F 3/061 |
| | | | 711/151 |
| 2016/0132357 A1 | 5/2016 | Kuraishi et al. | |
| 2017/0004191 A1 | 1/2017 | Iida | |
| 2019/0213498 A1 * | 7/2019 | Adjaoute | G06N 20/00 |

FOREIGN PATENT DOCUMENTS

| | | |
|---|---|---|
| JP | 2016-091555 A | 5/2016 |
| WO | 2015/193973 A1 | 12/2015 |

OTHER PUBLICATIONS

International Search Report for PCT/JP2018/015983, dated Jul. 10, 2018.

* cited by examiner

210 ANALYSIS TARGET DATA FETCHING DESIGNATION

USED ANALYSIS LOGIC NAME — 211

FAULT SIGN ANALYSIS

212 CORRESPONDENCE DEFINITION INFORMATION

| MINIMUM ANALYSIS DATASET ITEM NAME (2121) | ANALYSIS TARGET DATA ITEM NAME (2122) |
|---|---|
| ID# | mac |
| timestamp | time |
| data | w1, w2, w3 |

213 FETCHING DATA RANGE

| ANALYSIS TARGET DATA ITEM NAME | REPETITION RANGE | REPETITION UNIT | REPETITION PRIORITY |
|---|---|---|---|
| mac | #1 - #3 | - | 1 |
| time | 8:00-8:03 | 1 | 2 |
| 2131 | 2132 | 2133 | 2134 |

214

ACCESS METHOD
ret = `curl http://abc.com/api/${id}/${time}_${time+time_loop}`
w1 = ret["v1"]
w2 = ret["v2"]
w3 = ret["v3"]

RESOURCE ALLOCATION METHOD — 215

RESOURCE EFFICIENCY EMPHASIS

DATA ANALYSIS TIME LIMIT — 216

310 FETCHED DATA METADATA

| # | ANALYSIS TARGET REPETITION RANGE DATA ITEM NAME | | DATA ITEM NAME |
|---|---|---|---|
| | mac | time | |
| 1 | 1 | 8:00 | w1,w2 |
| 2 | 1 | 8:01 | w1,w2 |
| 3 | 1 | 8:02 | w1,w2,w3 |
| 4 | 1 | 8:03 | w1,w2,w3 |
| 5 | 2 | 8:00 | w1,w2 |
| 6 | 2 | 8:01 | w1,w2 |
| 7 | 2 | 8:02 | w1,w2,w3 |
| 8 | 2 | 8:03 | w1,w2,w3 |

311  312  313  314

FETCHED DATA ACCESS ORDER LIST

320

170 DATA FETCHING INSTRUCTION QUEUE

| ANALYSIS TARGET DATA ITEM NAME ||
|---|---|
| mac | time |
| 1 | 8:01 |
| 2 | 8:00 |
| 2 | 8:01 |
| ~1701 | ~1702 |

*FIG. 7A*

180 DATA ANALYSIS INSTRUCTION QUEUE

| ANALYSIS TORQUE DATA ITEM NAME ||
|---|---|
| mac | time |
| 1 | 8:00 |
| 1 | 8:02 |
| 1 | 8:03 |
| 2 | 8:02 |
| 2 | 8:03 |
| ~1801 | ~1802 |

*FIG. 7B*

190 DATA DISCARD INSTRUCTION QUEUE

| ANALYSIS TARGET DATA ITEM NAME || DATA ITEM NAME |
|---|---|---|
| mac | time | |
| 1 | 8:00 | w1,w2 |
| 1 | 8:01 | w1,w2 |
| 2 | 8:00 | w1,w2 |
| 2 | 8:01 | w1,w2 |
| ~1901 | ~1902 | ~1903 |

*FIG. 7C*

COMPUTER SYSTEM AND DATA ANALYSIS METHOD

CLAIM OF PRIORITY

The present application claims priority from Japanese patent application JP 2017-111514 filed on Jun. 6, 2017, the content of which is hereby incorporated by reference into this application.

BACKGROUND

The present invention relates to a computer system that reads and analyzes data.

An analysis infrastructure that transmits data accumulated in a computer system of a user and performs an analysis process to extract problems and detect a sign of fault has become widespread. The datacenter that provides the analysis infrastructure provides a visualization tool or the like of an analysis process and data to a user and performs processing on the data transmitted by the user. As such an analysis infrastructure, a service that visualizes data extracted from a database and performs data analysis interactively is known (for example, International Patent Publication No. 2015/193973).

The user who uses the analysis infrastructure determines analysis target data and transmits data that needs to be transmitted to the analysis infrastructure. When transmit of data from the computer system of a user to an analysis infrastructure is completed, the user issues an analysis start instruction to the analysis infrastructure.

SUMMARY

In the conventional example, a user determines analysis target data, transmits data necessary for analysis, and issues an analysis instruction after transmission is completed. Due to this, there is a problem that it is not possible to issue an analysis instruction until data transmission is completed.

When a large amount of data is analyzed, for example, and several tens of hours are required for transmitting data, a considerable amount of time is taken to check the end of transmission. Although methods for predicting data transmit time are known (for example, Japanese Patent Application Publication No. 2016-91555), it cannot be said that transmission ends as predicted due to the state or a network or the like.

In the conventional example, when data transmission is completed in the midnight, an analysis start instruction is issued in the next day morning. When several tens of hours are required for an analysis process, there is a problem that an analysis process is not performed efficiently.

Therefore, the present invention has been made in view of the problems and an object thereof is to improve operation efficiency when acquiring and analyzing a large amount of data.

According to one aspect of the present invention, a computer system includes a first computer that includes a processor, a memory, and a storage and accumulates data and a second computer that includes a processor, a memory, and a storage and analyzes data accumulated in the first computer.

The second computer includes, a minimum analysis dataset in which a data item serving as an analysis target and a repetition unit are defined in advance for each analysis target and an agent that manages an acquisition process and an analysis process of the data. The agent receives an analysis target data fetching designation including the minimum analysis dataset to be used for analysis, a repetition range of repeating acquisition of data, and a repetition unit of repeating acquisition of data, generates a first process that acquires data from the first computer and a first instance that executes processing within the first process on the basis of the repetition range and the repetition unit included in the analysis target data fetching designation, and activate the first instance to acquire the accumulated data from the first computer. When the processing of the first instance is completed, the agent generates a second process that executes an analysis process with respect to the acquired data and a second instance that executes processing within the second process and activates the second instance to execute an analysis process.

Therefore, according to the present invention, when a large amount of data is acquired and analyzed, a user of a computer does not have to pay attention to a timing such as a data fetching completion timing and it is possible to improve operation efficiency remarkably when acquiring and analyzing a large amount of data.

Hereinafter, embodiments of the present invention will be described on the basis of the accompanying drawings.

BRIEF DESCRIPTION OF THE DRAWINGS

FIG. 5 is a diagram illustrating an example of the analysis target data fetching designation according to the first embodiment of this invention.

FIG. 7A is a diagram illustrating an example of the data fetching instruction queue according to the first embodiment of this invention.

FIG. 7B is a diagram illustrating an example of the data analysis instruction queue according to the first embodiment of this invention.

FIG. 7C is a diagram illustrating an example of the data discard instruction queue according to the first embodiment of this invention.

DETAILED DESCRIPTION OF THE PREFERRED EMBODIMENTS

Embodiment 1

Figure 1:
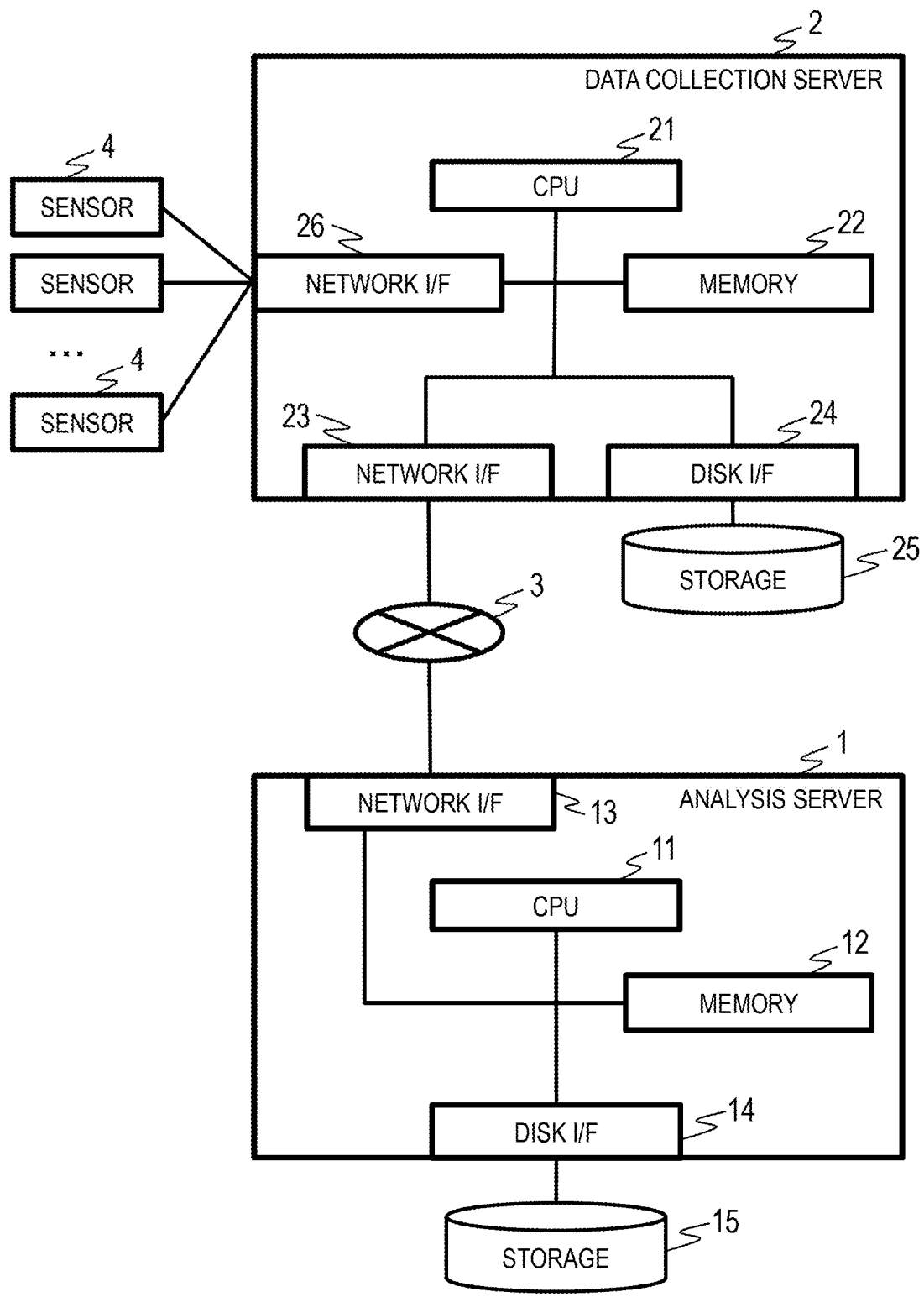
FIG. 1 is a block diagram illustrating an example of a hardware configuration of a computer system according to a first embodiment of this invention.

FIG. 1 illustrates Embodiment 1 of the present invention and is a block diagram illustrating an example of a hardware configuration of a computer system. The computer system includes a data collection server 2 that collects sensor data from sensors 4, an analysis server 1 that provides an analysis infrastructure of a data analysis service, and a network 3 that connects the data collection server 2 and the analysis server 1.

The analysis server 1 is a computer including a CPU 11 that performs an arithmetic process, a memory 12 that retains programs and data, a storage 15 that stores data and programs, a disk I/F 14 for accessing the storage 15, and a network I/F 13 for accessing the network 3.

The data collection server 2 is a computer including a CPU 21 that performs an arithmetic process, a memory 22 that retains programs and data, a storage 25 that stores data and programs, a disk I/F 24 for accessing the storage 25, a network I/F 23 for accessing the network 3, and a network I/F 26 for accessing the plurality of sensors 4.

The analysis server 1 and the data collection server 2 have an input device (a mouse, a keyboard, or the like) and an output device (a display or the like) which are not illustrated.

<Overview of System>

Figure 2:
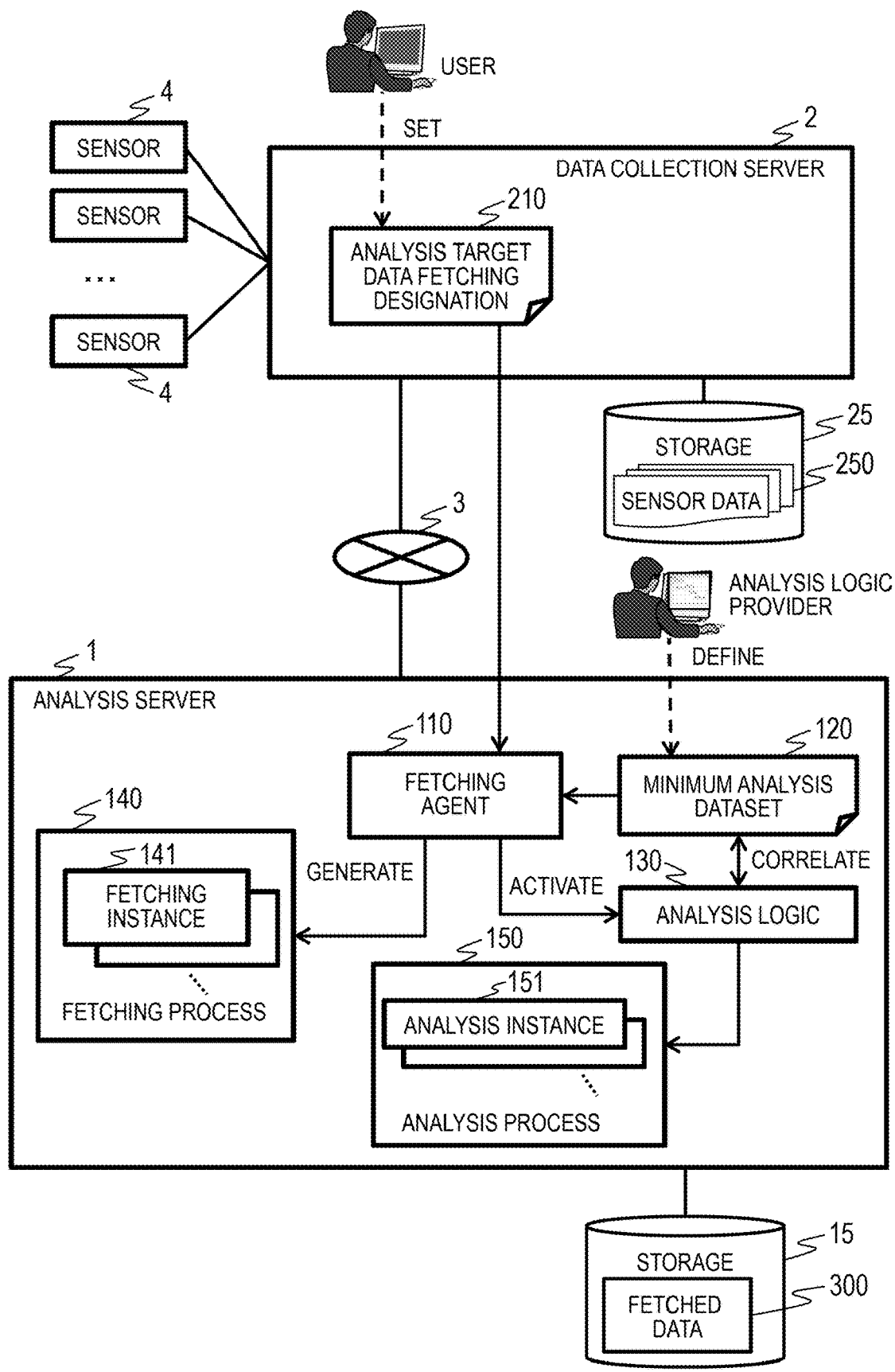
FIG. 2 is a block diagram illustrating an example of functions of a computer system according to the first embodiment of this invention.

FIG. 2 is a block diagram illustrating an example of functions of a computer system. The data collection server 2 accumulates sensor data 250 collected from the sensors 4 in the storage 15. Data collection by the data collection server 2 is executed continuously.

A user of the data collection server 2 sets information for using the analysis server 1 as an analysis target data fetching designation, and the data collection server 2 transmits the analysis target data fetching designation 210 and an analysis start instruction to the analysis server 1.

As will be described later, the analysis target data fetching designation 210 includes information such as the name of an analysis logic (or service) to be used, a range of analysis target sensor data 250 (hereinafter analysis target data), and an access method for accessing the analysis target data stored in the storage 25 of the data collection server 2. Moreover, the user of the data collection server 2 activates an editing program or the like (not illustrated) to generate the analysis target data fetching designation 210.

The analysis server 1 has a plurality of types of analysis logics 130, and minimum analysis dataset 120 is defined in advance by an analysis logic provider (or an administrator or the like).

When the analysis server 1 receives the analysis target data fetching designation 210 and the analysis start instruction from the data collection server 2, the fetching agent 110 acquires a minimum analysis dataset 120 corresponding to the analysis logic 130 to be used.

The fetching agent 110 determines analysis target data (the sensor data 250) to be fetched from the storage 15 of the data collection server 2 on the basis of an access method or the like for accessing analysis target data described in the analysis target data fetching designation 210 to generate and activate a fetching process 140 and a fetching instance 141 for acquiring the analysis target data.

A process of acquiring the analysis target data is performed by one or more fetching processes 140. The fetching process 140 includes one or more fetching instances 141. In Embodiment 1, an example in which parallel processing is performed by a plurality of fetching processes 140 and a plurality of fetching instances 141 will be illustrated.

The fetching instance 141 in the fetching process 140 reads the analysis target data from the data collection server 2 and stores the analysis target data in the storage 15 as fetched data 300. The fetching agent 110 monitors the fetching process 140 and the fetching instance 141 and generates an analysis process 150 and an analysis instance 151 from the analysis logic 130 to execute an analysis process when fetching of the analysis target data is completed.

A process of analyzing analysis target data is performed by one or more analysis processes 150. The analysis process 150 includes one or more analysis instances 151. In Embodiment 1, an example in which parallel processing is performed by a plurality of analysis processes 150 and a plurality of analysis instances 151 is illustrated.

As will be described later, the fetching agent 110 controls the degree of parallelism of the fetching process 140 and the fetching instance 141 on the basis of the performance of the fetching process 140 and the fetching instance 141.

As will be described later, the fetching agent 110 controls the degree of parallelism of the analysis process 150 and the analysis instance 151 on the basis of the performance of the analysis process 150 and the analysis instance 151 generated by the analysis logic 130.

A user of the data collection server 2 can access the analysis server 1 as necessary to acquire a processing result of the analysis target data. In this manner, in the present embodiment, the user of the data collection server 2 may generate the analysis target data fetching designation 210 including designation of analysis target data and designation of the analysis logic 130, transmit the analysis target data fetching designation 210 to the analysis server 1, and output an analysis start instruction.

That is, unlike the conventional example, it is not necessary to designate analysis target data to transmit the analysis target data to the analysis server 1, and output an analysis start instruction after transmission is completed. Therefore, it is possible to perform an analysis process efficiently. In the present embodiment, the user of the data collection server 2 does not need to monitor the progress of transmission of the analysis target data, and the burden of the user can be alleviated. Moreover, since the process of fetching and analyzing the analysis target data can be finalized by outputting the analysis target data fetching designation 210, it is possible to output an instruction to the analysis infrastructure very easily.

<Software Resource>

Figure 3:
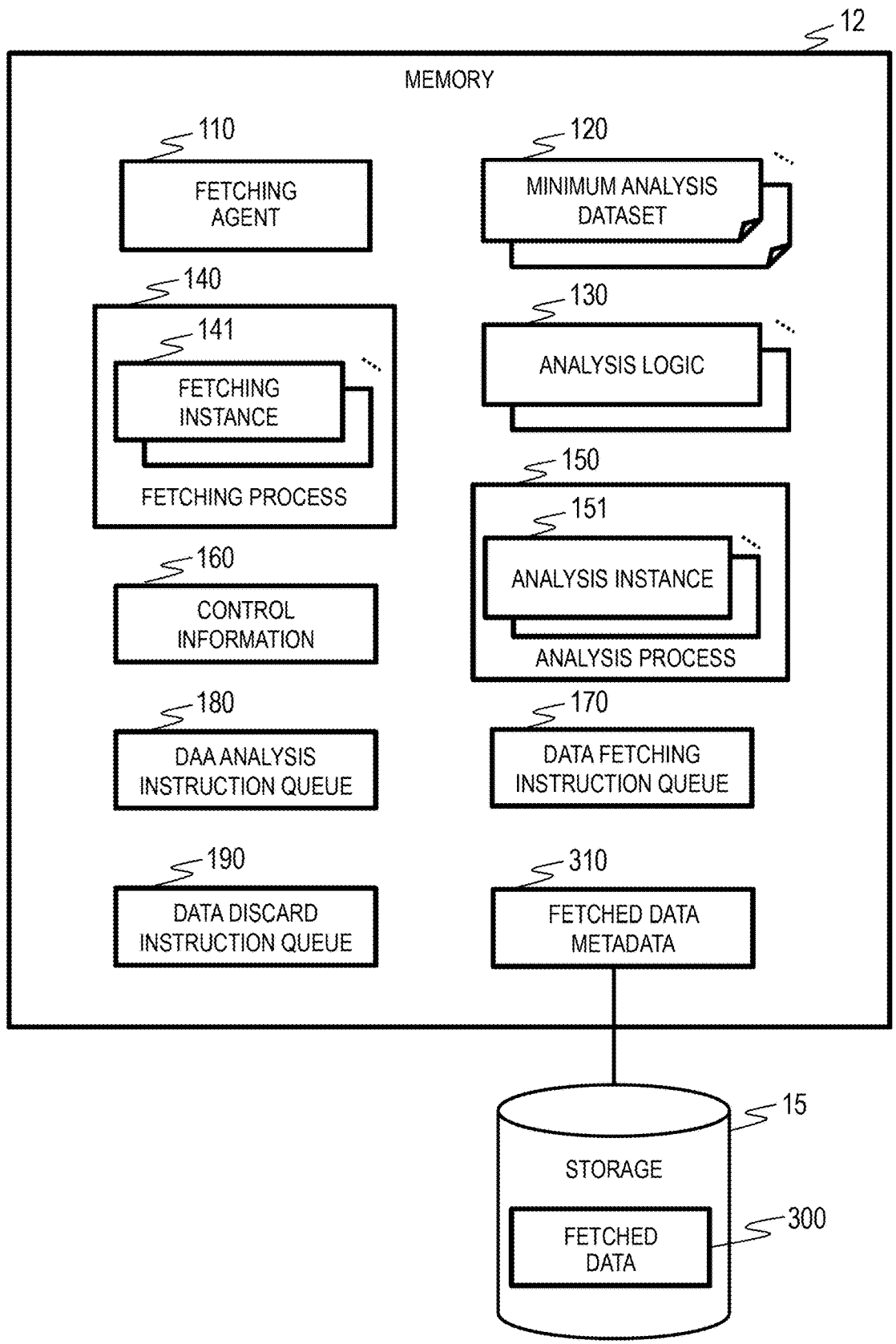
FIG. 3 is a block diagram illustrating an example of software resources of the analysis server 1 according to the first embodiment of this invention.

FIG. 3 is a block diagram illustrating an example of software resources of the analysis server 1. The fetching agent 110, one or more minimum analysis datasets 120, the fetching process 140, the fetching instance 141, one or more analysis logics 130, the analysis process 150, the analysis instance 151, control information 160, a data fetching instruction queue 170, a data analysis instruction queue 180, a data discard instruction queue 190, and a fetched data metadata 310 are retained in the memory 12 of the analysis server 1.

The analysis target data read from the data collection server 2 is stored in the storage 15 of the analysis server 1 as fetched data 300.

The fetching agent 110 generates the fetching process 140 the fetching instance 141 for acquiring analysis target data from the data collection server 2 and generates and activates the analysis process 150 and the analysis instance 151 from the analysis logic 130 after fetching of the analysis target data is completed. The fetching agent 110 manages the process ranging from acquisition of the analysis target data and to completion of the analysis process.

The minimum analysis dataset 120 is information in which a data item of analysis target data and a repetition unit of an analysis process are defined in advance for each analysis logic 130 (for each user of the data collection server 2).

The analysis logic 130 is information prepared in advance for each analysis type and each piece of analysis target data.

The control information 160 retains information necessary for execution of the fetching agent 110, the fetching process 140, the fetching instance 141, the analysis process 150, and the analysis instance 151.

The data fetching instruction queue 170 is a buffer controlling a process in which the fetching process 140 and the fetching instance 141 fetch analysis target data from the data collection server 2. When a fetching command is stored in the data fetching instruction queue 170, the fetching agent 110 activates the fetching process 140 and the fetching instance 141 and reading of the analysis target data starts.

The data analysis instruction queue 180 is a buffer used when the fetching agent 110 generates the analysis process 150 and the analysis instance 151 on the basis of the analysis logic 130. When an analysis command is stored in the data analysis instruction queue 180, the fetching agent 110 activates the analysis process 150 and the analysis instance 151 to start an analysis process of analyzing analysis target data.

The data discard instruction queue 190 is a buffer discarding the fetched data 300 stored in the storage 15. When a data discard command is stored in the data discard instruction queue 190, data is discarded until a usage rate of the storage 15 becomes a predetermined threshold or smaller. The usage rate (a volume usage rate) of the storage 15 is the ratio of the volume of the fetched data 300 to the volume of the storage 15.

The fetched data metadata 310 is metadata of the analysis target data stored in the storage 15. The fetched data metadata 310 is managed by the fetching agent 110. The fetching agent 110 can generate the fetched data metadata 310 when fetching the sensor data 250 and storing the same in the fetched data 300. Generation of the fetched data metadata 310 may be performed by the fetching agent 110 at a predetermined timing.

The functional units such as the fetching agent 110, the fetching process 140, the fetching instance 141, the analysis process 150, and the analysis instance 151 are loaded into the memory 12 as programs.

The CPU 11 operates as a functional unit that provides a predetermined function by performing processing according to the programs of the respective functional units. For example, the CPU 11 functions as the fetching agent 110 by performing processing according to a fetching agent program. The same is true to the other programs. Furthermore, the CPU 11 also operates as a functional unit that provides respective functions of the plurality of processes executed by the respective programs. The computer and the computer system are a device and a program including these functional units.

Information such as programs and tables that realize the functions of the analysis server 1 can be stored in the storage 15, a storage device such as a nonvolatile semiconductor memory, a hard disk drive, or a solid state drive (SSD), or a non-transitory computer-readable data storage medium such as an IC card, an SD card, or a DVD.

<Minimum Analysis Dataset>

Figure 4:
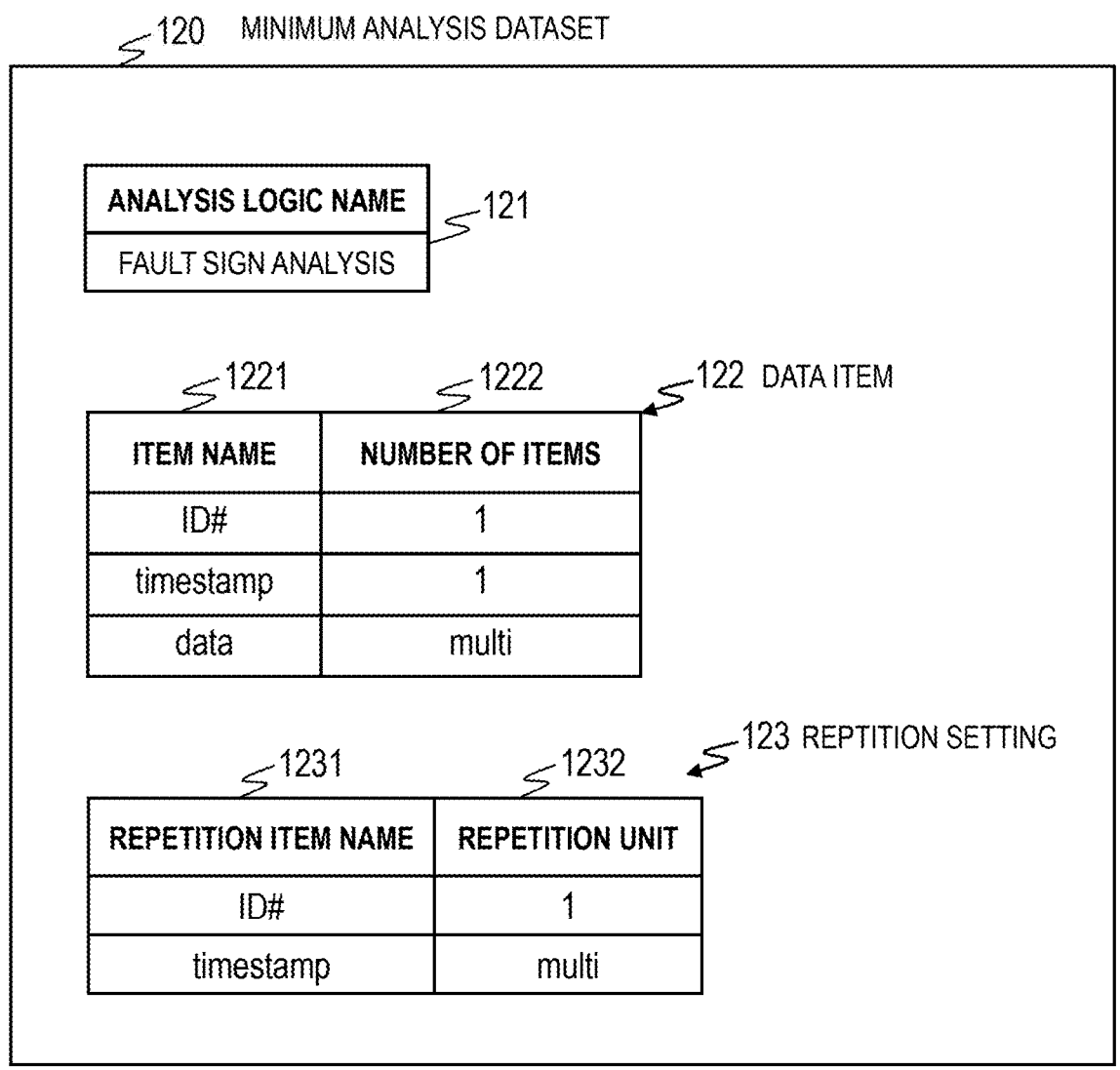
FIG. 4 is a diagram illustrating an example of the minimum analysis dataset 120 according to the first embodiment of this invention.

FIG. 4 is a diagram illustrating an example of the minimum analysis dataset 120. In the minimum analysis dataset 120, an item of a data fetching process executed repeatedly by the fetching process 140, a repetition range, a repetition unit, and the like are set in advance.

The minimum analysis dataset 120 is information set in advance by an analysis logic provider or the like for each type of the analysis logic 130.

The minimum analysis dataset 120 includes an analysis logic name 121, a data item 122, and a repetition setting 123. The analysis logic name 121 stores the name or the identifier of the analysis logic 130 that performs analysis.

The data item 122 includes an item name 1221 and the number of items 1222. In the illustrated analysis logic name 121 of "fault sign analysis", the item name 1221 is made up of three items of an ID number, a timestamp, and data, and the number of items of data is set to "multi" and a plurality of pieces of data can be included. For example, three pieces of data of w1, w2, and w3 can be included in the data item of one ID number and one timestamp.

The repetition setting 123 includes a repetition item name 1231 and a repetition unit 1232. In the illustrated analysis logic name 121 of "fault sign analysis", the repetition unit 1232 is set to 1 for the repetition item name 1231 of an ID number, and the repetition unit 1232 is set to "multi" for the repetition item name 1231 of a timestamp, and a plurality of pieces of data can be included.

That is, in the illustrated analysis logic name 121 of "fault sign analysis", it is defined that an analysis process is performed in the range (for example, 5 minutes or the like) of a timestamp set in advance for one ID number.

The analysis server 1 has a plurality of types of analysis logics 130, and the minimum analysis dataset 120 is a definition set in advance for each analysis logic 130 by a logic provider or the like. The fetching agent 1100 executes a data fetching process and a data analysis process according to the minimum analysis dataset 120 set in advance.

<Analysis Target Data Fetching Designation>

FIG. 5 is a diagram illustrating an example of the analysis target data fetching designation 210. The analysis target data fetching designation 210 is information set by the user of the data collection server 2 that uses the analysis server 1 before the user outputs an analysis instruction. The analysis target data fetching designation 210 may be a file or the like set in advance.

The analysis target data fetching designation 210 includes a used analysis logic name 211, correlation definition information 212, a fetching data range 213, an access method 214, a resource allocation method 215, and a data analysis time limit 216.

The used analysis logic name 211 includes the name (or the identifier) of an analysis logic name to be used among the analysis logics 130 of the analysis server 1.

The correlation definition information 212 includes a minimum analysis dataset item name 2121 and an analysis target data item name 2122. The correlation definition information 212 is information that defines a correlation between a data item of the sensor data 250 accumulated in the storage 25 of the data collection server 2 and a data item fetched by the fetching agent 110.

In the minimum analysis dataset item name 2121, "ID number", "timestamp", and "data" which are the same item names as the item name 1221 illustrated in FIG. 4 are defined. In the minimum analysis dataset item name 2121, "mac", "time", and "w1, w2, w3" are set as the items corresponding to the minimum analysis dataset among the items of the sensor data 250. mac indicates a "media access control" address.

That is, it is set such that "mac (address)" is used as the "ID number", "time" is used as the "timestamp", and a set of three values of "w1, w2, w3" is used as the "data".

The fetching data range 213 designates the range of the sensor data 250 to be analyzed presently for the repetition setting 123 of the data defined by the minimum analysis dataset 120. The fetching data range 213 includes an analysis target data item name 2131, a repetition range 2132, a repetition unit 2133, and a repetition priority 2134.

In the illustrated example, it is set such that, analysis is repeated for the sensor data 250 of which the value of the "mac (media access control)" of the analysis target data item name 2131 is the repetition range 2132 of "#1 to #3", and analysis is repeated for the sensor data 250 of which the value of "time" of the analysis target data item name 2131 is the repetition range 2132 of "8:00 to 8:03" and the repetition unit 2133 is "1" minute. Moreover, the repetition priority 2134 is set such that "time" is 2 next to "mac" of 1.

Therefore, it is set such that analysis is performed at intervals of 1 minute in the range of 8:00 to 8:03 in the order of the values of "mac". In the present embodiment, although an example in which the mac address is used as the analysis target data item name 2131 has been illustrated, there is no limitation thereto.

As for the access method 214, an access path and an access range of the storage 25 in which the sensor data 250 serving as the analysis target data is stored are defined as "ret='curl http://abc.com/api/${id}/${time}_${time+time_loop}'", and it is designated such that the return values of the analysis target data item name 2122 of "w1, w2, w3" are "ret["v1"], ret["v2"], ret["v3"]".

Either performance emphasis or resource efficiency emphasis can be set to the resource allocation method 215. When resource efficiency emphasis is set to the resource allocation method 215, analysis is performed using minimum resources so that analysis ends within the data analysis time limit 216. In the case of performance emphasis, fetching and analysis of data are controlled so that an analysis result is obtained in a shortest period. The largest value of the time allowed for an analysis process is set to the data analysis time limit 216, and in the illustrated example, it is requested that an analysis process is completed within 10 hours.

In this way, in the analysis target data fetching designation 210, a repetition range of the process of acquiring and analyzing the sensor data 250 is set in the fetching data range 213, and the location of data to be fetched is set in the access method 214. Moreover, the definition of the minimum analysis dataset 120 and the correlation of the sensor data 250 are set in the analysis target data fetching designation 210.

<Metadata>

Figures 6A, 6B:
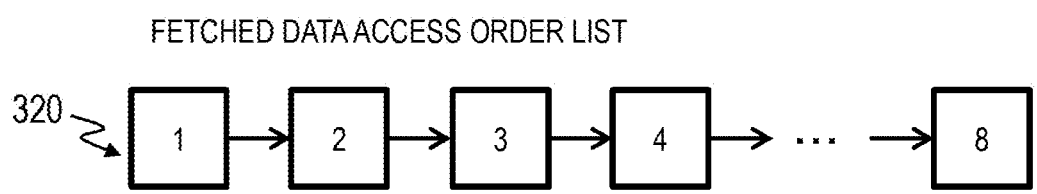
FIG. 6A is a diagram illustrating an example of metadata of the fetched data fetched by the analysis server according to the first embodiment of this invention.
FIG. 6B is a diagram illustrating an example of an access order list of the fetched data metadata according to the first embodiment of this invention according to the first embodiment of this invention.

FIG. 6A is a diagram illustrating an example of metadata of the fetched data 300 fetched by the analysis server 1. The fetched data metadata 310 retains the metadata of the fetched data 300 stored in the storage 15 of the analysis server 1.

The fetched data metadata 310 includes number 311, mac 312, time 313, and data item name 314 in one entry. The mac 312 and the time 313 indicate an analysis target repetition range data item name.

The number 311 is a serial value assigned by the analysis server 1. In the illustrated example, the data item name 314 of the time 313 of 8:00 to 8:03 is stored for each value of the mac 312. In the illustrated example, data in which "w3" is missing like the data item name 314 of "w1, w2" is included.

When new data is fetched to the fetched data 300, the fetching agent 110 calculates meta information of the data and adds the meta information to the fetched data metadata 310.

FIG. 6B is a diagram illustrating an example of an access order list 320 of the fetched data metadata 310. In the illustrated example, it is defined such that the fetched data metadata 310 is accessed in the order of the number 311. When data to be discarded is accessed, last recently used (LRU) or the like other than the list may be used.

<Configuration of Queue>

FIG. 7A is a diagram illustrating an example of the data fetching instruction queue 170. The data fetching instruction queue 170 indicates the smallest dataset in a data fetching instruction queue and includes mac 1701 and time 1702 in one entry.

In the data fetching instruction queue 170, analysis target data designated by the mac 1701 and the time 1702 is acquired from the storage 25 of the data collection server 2 by the fetching agent 110. An entry for which data acquisition has been completed is removed from the data fetching instruction queue 170 by the fetching agent 110.

FIG. 7B is a diagram illustrating an example of the data analysis instruction queue 180. The data analysis instruction queue 180 indicates the smallest dataset in a data analysis instruction queue and includes mac 1801 and time 1802 in one entry.

In the data analysis instruction queue 180, fetched data 300 specified by the mac 1801 and the time 1802 is read, and an analysis process is started by the analysis process 150. An entry for which data analysis has been completed is removed from the data analysis instruction queue 180 by the fetching agent 110.

FIG. 7C is a diagram illustrating an example of the data discard instruction queue 190. The data discard instruction queue 190 indicates the smallest dataset discarded preferentially when a data discard instruction is executed.

The data discard instruction queue 190 includes mac 1901, time 1902, and data item name 1903 in one entry. A plurality of values can be included in the data item name 1903.

In the data discard instruction queue 190, fetched data 300 designated by the mac 1901, the time 1902, and the data item name 1903 is removed from the storage 15 by the fetching agent 110. An entry for which data removal is completed is removed from the data discard instruction queue 190 by the fetching agent 110.

<Control Information>

Figure 8:
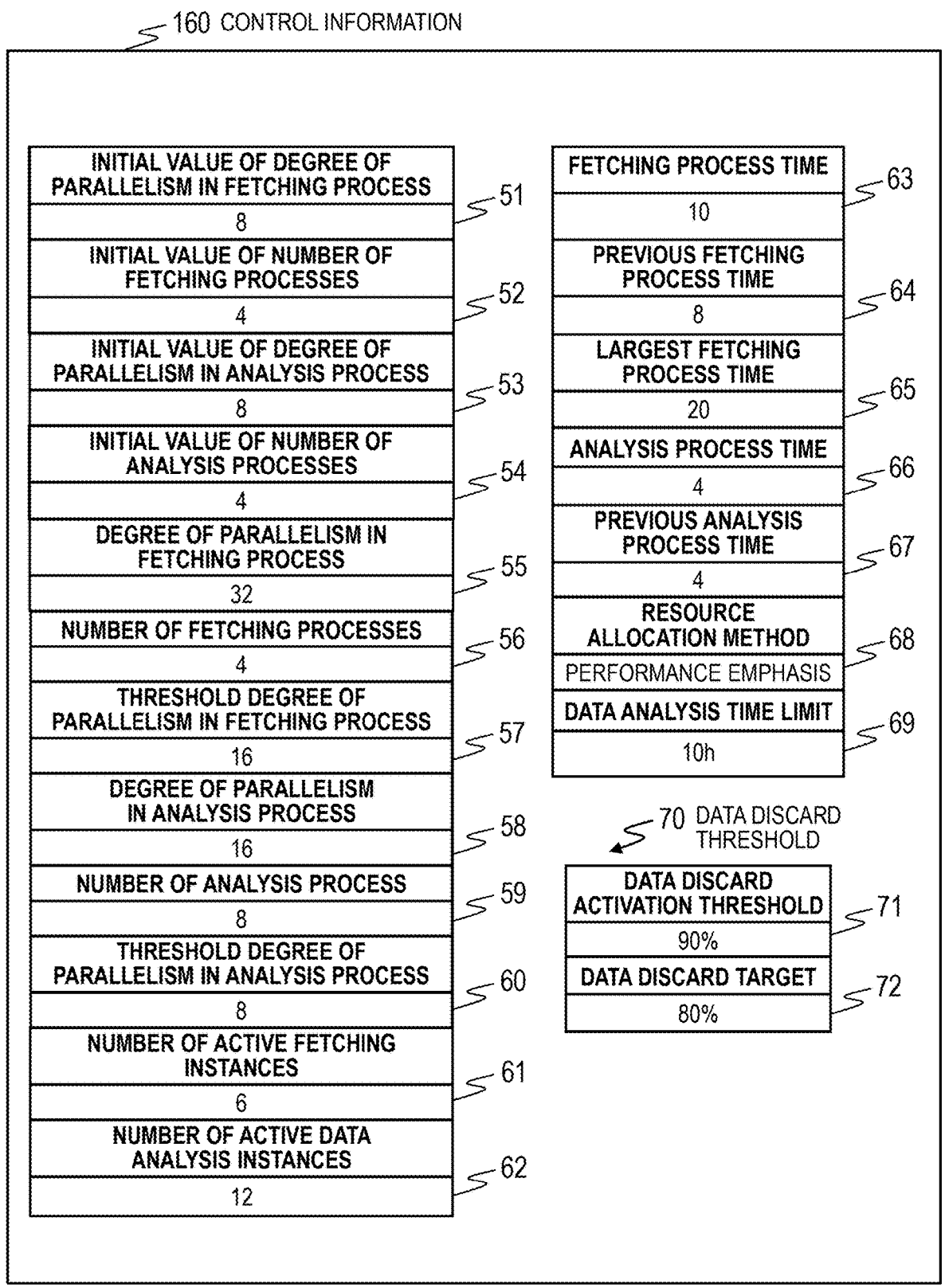
FIG. 8 is a diagram illustrating an example of the control information according to the first embodiment of this invention.

FIG. 8 is a diagram illustrating an example of the control information 160. The control information 160 is data used by the fetching agent 110 operated in the analysis server 1.

An initial value of degree of parallelism in fetching process 51 indicates an initial value of the fetching instance 141 executed by one fetching process 140. An initial value of number of fetching processes 52 indicates an initial value of the number of fetching processes 140 to be executed.

An initial value of degree of parallelism in analysis process 53 indicates an initial value of the number (degree of parallelism) of analysis instances 151 in the analysis process 150 executing data analysis. An initial value of number of analysis processes 54 indicates an initial value of the number (degree of parallelism) of analysis processes 150 to be executed.

A degree of parallelism in fetching process 55 indicates the number of fetching instances 141 executed in the fetching process 140. The number of fetching processes 56 indicates the number of fetching processes 140 to be executed. The degree of parallelism in fetching process 55 is set for each fetching process 140.

The maximum value of the degree of parallelism in fetching process 55 is set in advance in a threshold degree of parallelism in fetching process 57.

The degree of parallelism in analysis process 58 indicates the number of generated analysis instances 151. The number of analysis processes 59 indicates the number of generated analysis processes 150. The degree of parallelism in analysis process 58 is set for each analysis process 150. The maximum value of the degree of parallelism 58 in analysis process is set in advance in a threshold degree of parallelism in analysis process 60.

The number of active fetching instances 61 indicates the number of fetching instances 141 in execution. The number of active data analysis instances 62 indicates the number of analysis instances 151 in execution.

A fetching process time 63 indicates a fetching process time in the present degree of parallelism in fetching process 55 and is the time taken from the start to the end of the fetching instance 141 in the fetching process 140. A previous fetching process time 64 indicates a fetching process time before the degree of parallelism in fetching process 55 is changed. A largest fetching process time 65 indicates the largest allowable processing time.

An analysis process time 66 is the time required for an analysis process and indicates the time taken from the start to the end of the analysis instance 151 in the analysis process 150. A previous analysis process time 67 indicates an analysis process time before the degree of parallelism in analysis process 58 is changed.

Either performance emphasis or resource efficiency emphasis is set in the resource allocation method 68. When resource efficiency emphasis is set in the resource allocation method 68, analysis is performed using minimum resources so that analysis ends within the data analysis time limit 69. In the case of performance emphasis, fetching and analysis of data are controlled so that an analysis result is obtained in a shortest period. The largest value of the time allowed for an analysis process is set to the data analysis time limit 69, and in the illustrated example, it is requested that an analysis process is completed within 10 hours.

A data discard threshold 70 includes a data discard activation threshold 71 and a data discard target 72. The data discard activation threshold 71 activates a data discard process when the volume usage rate of the storage 15 is the threshold or more. The data discard target 72 indicates a target value (%) of the volume usage rate of the storage 15 in a data discard process.

The degree of parallelism in fetching process 55 and the number of fetching processes 56 indicate the degree of parallelism of a data fetching process. In Embodiment 1, the degree of parallelism of the data fetching process indicates the number of minimum analysis datasets 120 fetched in parallel.

<Overview of Process>

Figure 9:
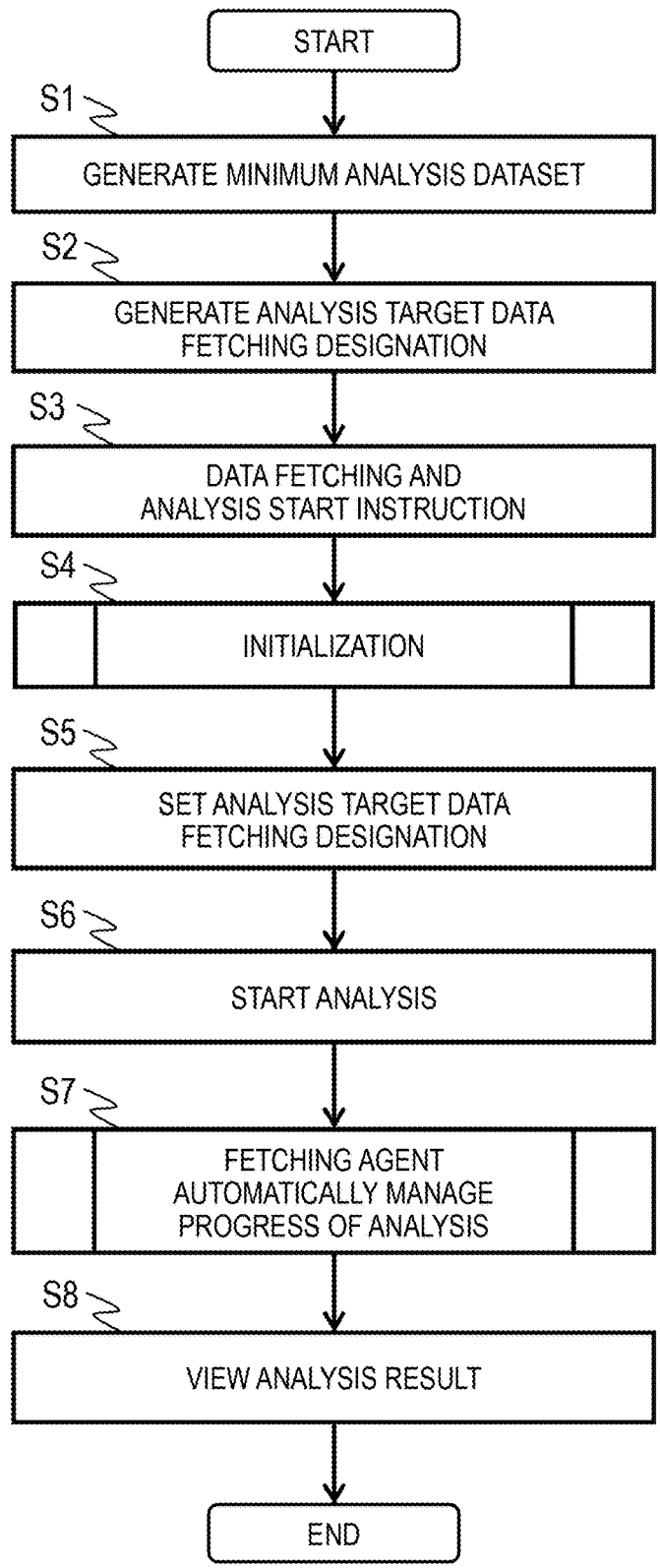
FIG. 9 is a flowchart illustrating an example of a process performed in the computer system according to the first embodiment of this invention.

FIG. 9 is a flowchart illustrating an example of a process performed in the computer system. This process starts on the basis of an instruction of an analysis logic provider or an administrator.

First, in step S1, the analysis server 1 generates a minimum analysis dataset 120. The analysis server 1 receives an input from an analysis logic provider or the like to generate the minimum analysis dataset 120.

In step S2, the data collection server 2 generates an analysis target data fetching designation 210. The data collection server 2 receives an input from a user or the like to generate a minimum analysis dataset 120. The respective items illustrated in FIG. 5 are set in the minimum analysis dataset 120 on the basis of the input from the user. This setting includes the access path and range of analysis target data, an analysis logic 130 to be used, a condition for repeating an analysis process, and the like.

In step S3, the data collection server 2 transmits an analysis target data fetching designation 210 and an analysis start instruction to the analysis server 1. The analysis start instruction transmitted to the analysis server 1 includes execution of an analysis target data fetching process and an analysis target data analysis process.

In step S4, the analysis server 1 executes initialization for executing a data fetching process and a data analysis process on the basis of the analysis start instruction received from the data collection server 2. In the initialization process, as will be described later, an area of the storage 15 for allowing the analysis server 1 to fetch data and an area of the memory 12 for executing analysis are secured.

In step S5, the analysis target data fetching designation 210 received by the analysis server 1 is read, analysis target information is set in the minimum analysis dataset 120, the control information 160, and the like, and the analysis logic 130 to be used and the queue to be used by the fetching agent 110 are set.

In step S6, the fetching agent 110 of the analysis server 1 starts fetching the analysis target data. The fetching agent 110 generates one or more fetching processes 140 and one or more fetching instances 141 to acquire data designated in the fetching data range 213 from the access path in the access method 214 described in the analysis target data fetching designation 210 from the data collection server 2.

In step S7, the fetching agent 110 manages execution of the analysis process 150 and the analysis instance 151 according to a progress state of the analysis process.

That is, when the analysis target data fetched from the data collection server 2 falls into the repetition range set in the minimum analysis dataset 120 and the analysis target data fetching designation 210, the fetching agent 110 generates the analysis process 150 and the analysis instance 151 to execute an analysis process.

The fetching agent 110 generates one or more analysis processes 150 and one or more analysis instances 151 on the basis of the analysis logic 130 to execute analysis of the data designated from the fetching agent 110.

The fetching agent 110 monitors the fetching process 140 and the fetching instance 141 and the analysis process 150 and the analysis instance 151 to control allocation of computer resources of the analysis server 1. The analysis logic 130 stores an analysis result of the analysis instance 151 in a predetermined area of the memory 12 or the storage 15.

In step S8, the analysis server 1 completes the designated analysis process and receives an analysis result view request from the data collection server 2 used by the user. The fetching agent 110 of the analysis server 1 acquires an analysis result according to the view request and transmits the analysis result to the data collection server 2.

With the above-described process, as for the user who uses the analysis server 1, when the analysis target data fetching designation 210 and the analysis start instruction are transmitted from the data collection server 2, the fetching agent 110 can automatically perform a process ranging from acquisition of data to execution of an analysis process. The user can view the analysis result after execution of the analysis process is completed.

Although an example in which the user issues an analysis start instruction from the data collection server 2 has been illustrated, there is no limitation thereto. The computer used by the user and the data collection server 2 may be different computers.

<Process of Fetching Agent>

Figure 10:
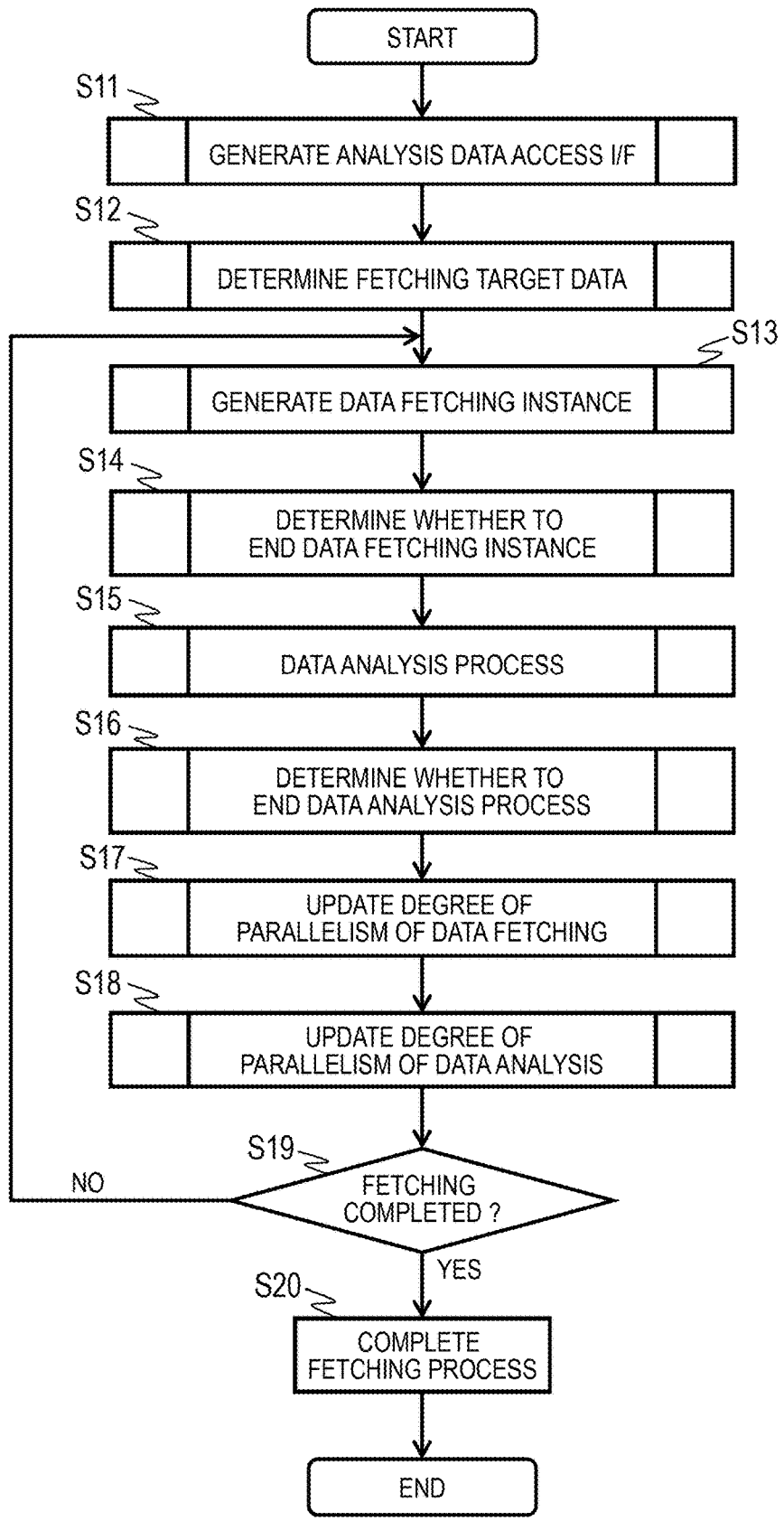
FIG. 10 is a flowchart illustrating an example of the data fetching process of the analysis server according to the first embodiment of this invention.

FIG. 10 is a flowchart illustrating an example of the data fetching process of the analysis server 1. In step S11, an interface for allowing the fetching agent 110 to collect analysis target data from the data collection server 2 is generated. This process will be described with reference to FIG. 11.

In step S12, the fetching agent 110 determines data to be fetched from the data collection server 2 on the basis of the fetching data range 213 described in the received analysis target data fetching designation 210. This process will be described with reference to FIG. 12.

In step S13, the fetching agent 110 generates and activates the fetching process 140 and the fetching instance 141 for acquiring the determined fetching data. When a plurality of fetching processes 140 or a plurality of fetching instances 141 is generated, the processes or instances are executed in parallel. This process will be described with reference to FIG. 13.

In step S14, the fetching agent 110 determines whether the process of the fetching process 140 or the fetching instance 141 has been completed. This process will be described with reference to FIG. 14.

In step S15, when the fetched data 300 falls into the repetition range 2132 of the minimum analysis dataset 120, the fetching agent 110 generates the analysis process 150 and the analysis instance 151 on the basis of the analysis logic 130 to execute analysis. This process will be described with reference to FIG. 15.

In step S16, the fetching agent 110 acquires an operation state of the analysis process 150 and the analysis instance 151 to determine whether an analysis process will be ended. This process will be described with reference to FIG. 16.

In step S17, the fetching agent 110 executes a process of updating the degree of parallelism in fetching process 55 in the control information 160. With this process, the degree of parallelism of the fetching instance 141 is updated. This process will be described with reference to FIG. 17.

In step S18, the fetching agent 110 executes a process of updating the degree of parallelism in analysis process 58 in the control information 160. With this process, the degree of parallelism of the analysis instance 151 is updated. This process will be described with reference to FIG. 18.

In step S19, the fetching agent 110 deter mines whether fetching of the analysis target data has been completed. When analysis target data which has not been fetched completely is present, the flow returns to step S13 and the above-described process is repeated. When all pieces of analysis target data have been fetched, the flow proceeds to step S20 and the process ends.

With the above-described process, the fetching agent 110 acquires an access path for the data collection server 2 to read the analysis target data from the received analysis target data fetching designation 210 to generate a fetching interface, and subsequently, generates the fetching process 140 and the fetching instance 141 to start acquisition of data.

When the fetched data 300 falls into the repetition range 2132, the fetching agent 110 generates the analysis process 150 and the analysis instance 151 on the basis of the analysis logic 130 to start an analysis process. When all pieces of analysis target data are read and the analysis instance 151 is executed, the fetching agent 110 ends the process. When execution of all analysis instances 151 is completed, an analysis result is generated and the process ends.

The fetching agent 110 monitors the degrees of parallelism of the fetching instance 141 in the fetching process 140 and the analysis instance 151 in the analysis process 150 to update the degree of parallelism in fetching process 55 and the degree of parallelism in analysis process 58 to thereby adjust the numbers of processes and instances to be generated. That is, it is possible to adjust the computer resources to be allocated to the fetching process and the analysis process according to the resource allocation method 68 in the control information 160.

<Access I/F Generation Process>

Figure 11:
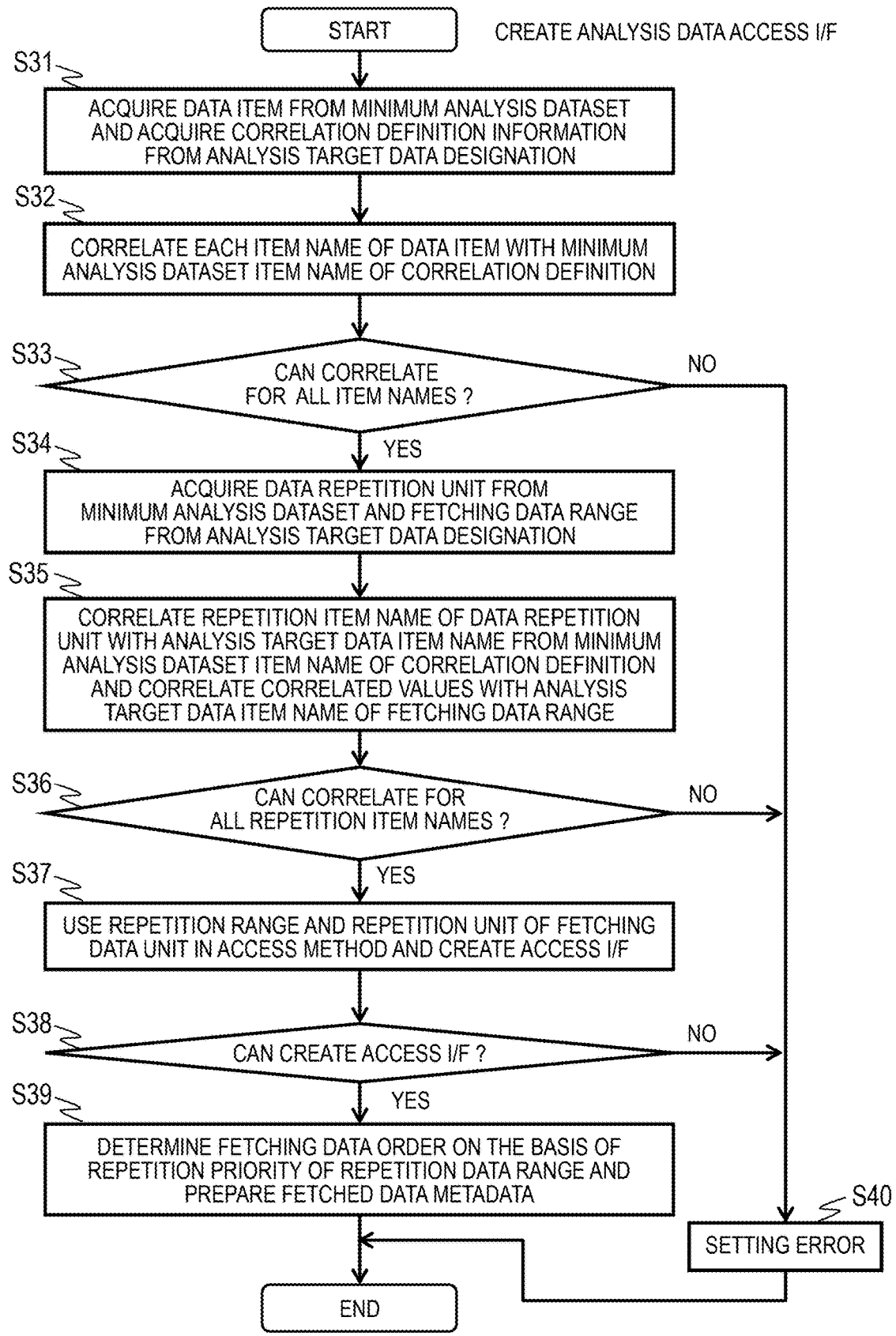
FIG. 11 is a flowchart illustrating an example of a process of generating an analysis target data access interface of the analysis server according to the first embodiment of this invention.

FIG. 11 is a flowchart illustrating an example of a process of generating an analysis target data access interface of the analysis server 1. This process is performed in step S11 of FIG. 10.

In step S31, the fetching agent 110 acquires the minimum analysis dataset 120 corresponding to the analysis logic 130 to be used to read the data item 122. Moreover, the fetching agent 110 acquires the correlation definition information 212 from the analysis target data fetching designation 210.

In step S32, the fetching agent 110 sets a correlation between the correlation definition information 212 and the data item 122 acquired in step S31. In step S33, the fetching agent 110 determines whether it is possible to set a correlation for all item names 1221 of the minimum analysis dataset 120. The flow proceeds to step S34 if possible and the flow proceeds to step S40 if not.

In step S34, the fetching agent 110 acquires the repetition setting 123 from the minimum analysis dataset 120 and acquires the fetching data range 213 from the analysis target data fetching designation 210.

In step S35, the fetching agent 110 correlates the analysis target data item name 2122 of the correspondence definition information 212 acquired from the analysis target data fetching designation 210 with the repetition item name 1231 of the minimum analysis dataset 120 and correlates the analysis target data item name 2131 of the analysis target data fetching designation 210 with the repetition item name 1231. In this way, the repetition item name 1231 of the minimum analysis dataset 120 and the fetching data range 213 of the analysis target data fetching designation 210 are correlated with each other using the analysis target data item name 2131 as a key.

In step S36, the fetching agent 110 determines whether it is possible to set the correlation for all repetition item names 1231 and all repetition units 1232 of the minimum analysis dataset 120. The flow proceeds to step S37 if possible and the flow proceeds to step S40 if not.

In step S37, the fetching agent 110 sets the repetition range 2132 and the repetition unit 2133 of the fetching data range 213 to the access path of the access method 214 to generate an access interface.

In step S38, the fetching agent 110 determines whether an access interface has been generated. The flow proceeds to step S39 if possible and the flow proceeds to step S40 if not.

In step S39, the fetching agent 110 determines the order of fetching data on the basis of the repetition priority 2134 of the fetching data range 213 and sets the fetched data metadata 310 as will be described later, and the process ends. On the other hand, in step S40, since it was not possible to generate the access interface, an error notification is sent to the data collection server 2, and the process ends.

With the above-described process, the fetching data range 213 of the analysis target data fetching designation 210 is received by the item name corresponding to the minimum analysis dataset 120, and an access interface is generated from the access path designated by the access method 214.

The order of fetching data from the data collection server 2 is determined on the basis of the repetition priority 2134 of the fetching data range 213 illustrated in FIG. 5, and the analysis target repetition range data item name (312 and 313) of the fetched data metadata 310 is set.

As illustrated in FIG. 6A, the fetching agent 110 prepares the fetched data metadata 310 in the analysis target repetition range data item name (312 and 313) using the repetition range 2132 and the repetition unit 2133 designated by the fetching data range 213 of the analysis target data fetching designation 210.

In the example of FIG. 5, for the data corresponding to ID #=mac=1, an entry of data corresponding to time=8:00 to 8:03 is generated at an interval of the repetition unit 2133 of "1" minute, and after that, an entry of data corresponding to ID #=mac=2 is generated in a similar order. The serial value of the fetching agent 110 is set in the number 311.

The fetching agent 110 stores the fetched data metadata 310 of the analysis target data fetched from the data collection server 2 in the storage 15 or the like, reads the data metadata 310 having the same analysis target data item name 2131 and the same repetition range 2132 of the fetching data range 213 among the analysis target data having the same access path, and sets the metadata in the data item name 314 of the fetched data metadata 310 generated in this manner.

When the fetched data metadata 310 having the same access path and the same fetching data range 213 is not present, the data item name 314 of the fetched data metadata 310 is left blank.

<Fetching Target Data Determination Process>

Figure 12:
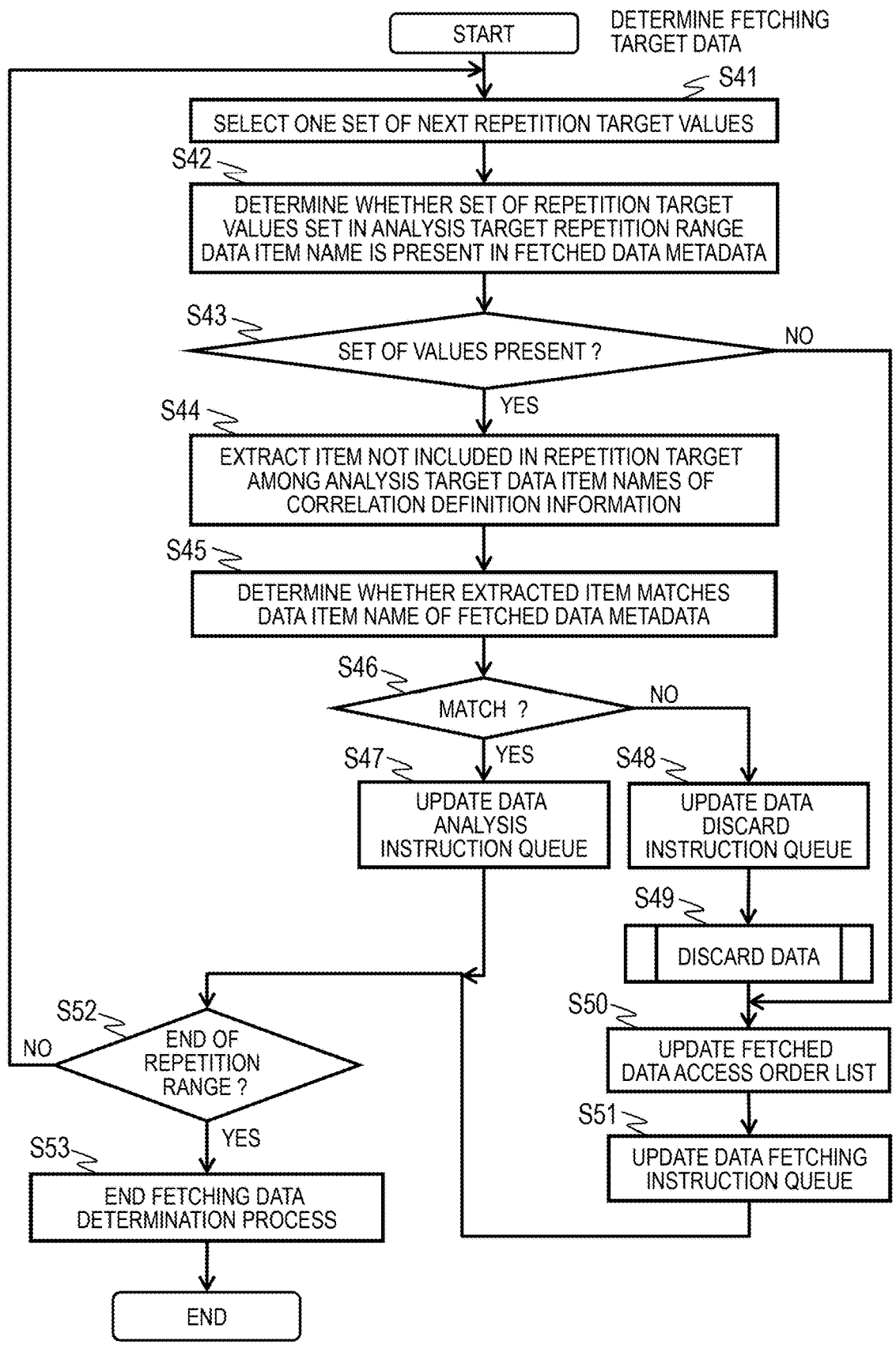
FIG. 12 is a flowchart illustrating an example of a fetching target data determination process of the analysis server according to the first embodiment of this invention.

FIG. 12 is a flowchart illustrating an example of a fetching target data determination process of the analysis server 1. This process is performed in step S12 of FIG. 10.

In step S41, the fetching agent 110 reads the fetched data metadata 310 prepared in the process of FIG. 11 and starts processing from the starting entry (number 311=1) illustrated in FIG. 6A.

In step S42, the fetching agent 110 determines whether a set of values of a repetition target set in the analysis target repetition range data item name (312 and 313) is present in the fetched data metadata 310. That is, the fetching agent 110 determines whether data fetched in the past is present in the storage 15.

The fetching agent 110 determines that the fetched data 300 corresponding to the set of values is not present if the data item name 314 in the entry of the mac 312 and the time 313 being processed presently is blank and determines that the fetched data 300 corresponding to the set of values is present if the data item name 314 is not blank.

In step S43, the fetching agent 110 proceeds to step S44 if the data corresponding to the set of values is present and proceeds to step S50 if not.

In step S44, the fetching agent 110 selects the analysis target data item name 2122 that is not included in the repetition target among the analysis target data item names 2122 of the correspondence definition information 212. In the example of the correspondence definition information 212 illustrated in FIG. 5, the minimum analysis dataset item name 2121 in which the value of "data" is "w1, w2, w3" is selected as the data item that is not included in the repetition target.

In step S45, the fetching agent 110 determines whether the data item extracted in step S44 matches the data item name 314 of the fetched data metadata 310. When the analysis target data item name 2122 is "w1, w2, w3", a determination condition is that the data item includes the three values.

In step S46, the fetching agent 110 determines that the condition is satisfied and proceeds to step S47 if three pieces of data are present in the data item name 314 of the fetched data metadata 310. The fetching agent 110 determines that the condition is not satisfied and proceeds to step S48 if three pieces of data are not present.

In step S47, since the fetched data 300 fetched in the past can be used, the fetching agent 110 sets the values of the mac 312 and the time 313 that identify the present data of the fetched data metadata 310 to the mac 1801 and the time 1802 of the data analysis instruction queue 180 illustrated in FIG. 7B.

On the other hand, in step S48, the fetching agent 110 determines that the analysis target data item name 2122 of the correspondence definition information 212 is changed and sets the data in the data discard instruction queue 190 illustrated in FIG. 7C as a discard target. Subsequently, in step S49, the fetching agent 110 sets a discard command to the data discard instruction queue 190 in order to discard data by a process to be described later.

In step S50, since the fetching agent 110 discarded (deleted) the data from the storage 15, the fetching agent 110 updates the fetched data access order list (FIG. 6B). This process removes the deleted fetched data 300 from the fetched data access order list.

In step S51, the fetching agent 110 sets the values of the mac 312 and the time 313 that identify the present data of the fetched data metadata 310 to the mac 1701 and the time 1702 of the data fetching instruction queue 170 illustrated in FIG. 7A in order to acquire the sensor data 250 from the data collection server 2.

In step S52, the fetching agent 110 determines whether acquisition of data in the fetching data range 213 designated by the fetching data range 213 has been completed. The flow proceeds to step S53 and the process ends when fetching of the data has been completed for all fetching data ranges 213. When data which has not been processed for the fetching data range 213 is present, the flow returns to step S41, the next entry of the fetched data metadata 310 is selected, and the above-described process is repeated.

With the above-described process, when the past fetched data 300 is present, the mac 312 and the time 313 of the selected entry are set in the data analysis instruction queue 180 and an analysis process is performed using the existing fetched data 300.

On the other hand, when the past fetched data 300 is present, the fetching agent 110 discards the unnecessary fetched data 300 and sets the mac 312 and the time 313 of the selected entry in the data fetching instruction queue 170 to acquire new sensor data 250.

The fetching agent 110 determines whether fetching target data is included in the fetched data metadata 310 and uses the data as new fetching target data if the data is not included. On the other hand, when metadata of which the data item name 314 only is different is present, it is determined that the correspondence definition information of the analysis target data fetching designation 210 on the user side has been changed, and the data is regarded as a discard target.

<Fetching Instance 141 Generation Process>

Figure 13:
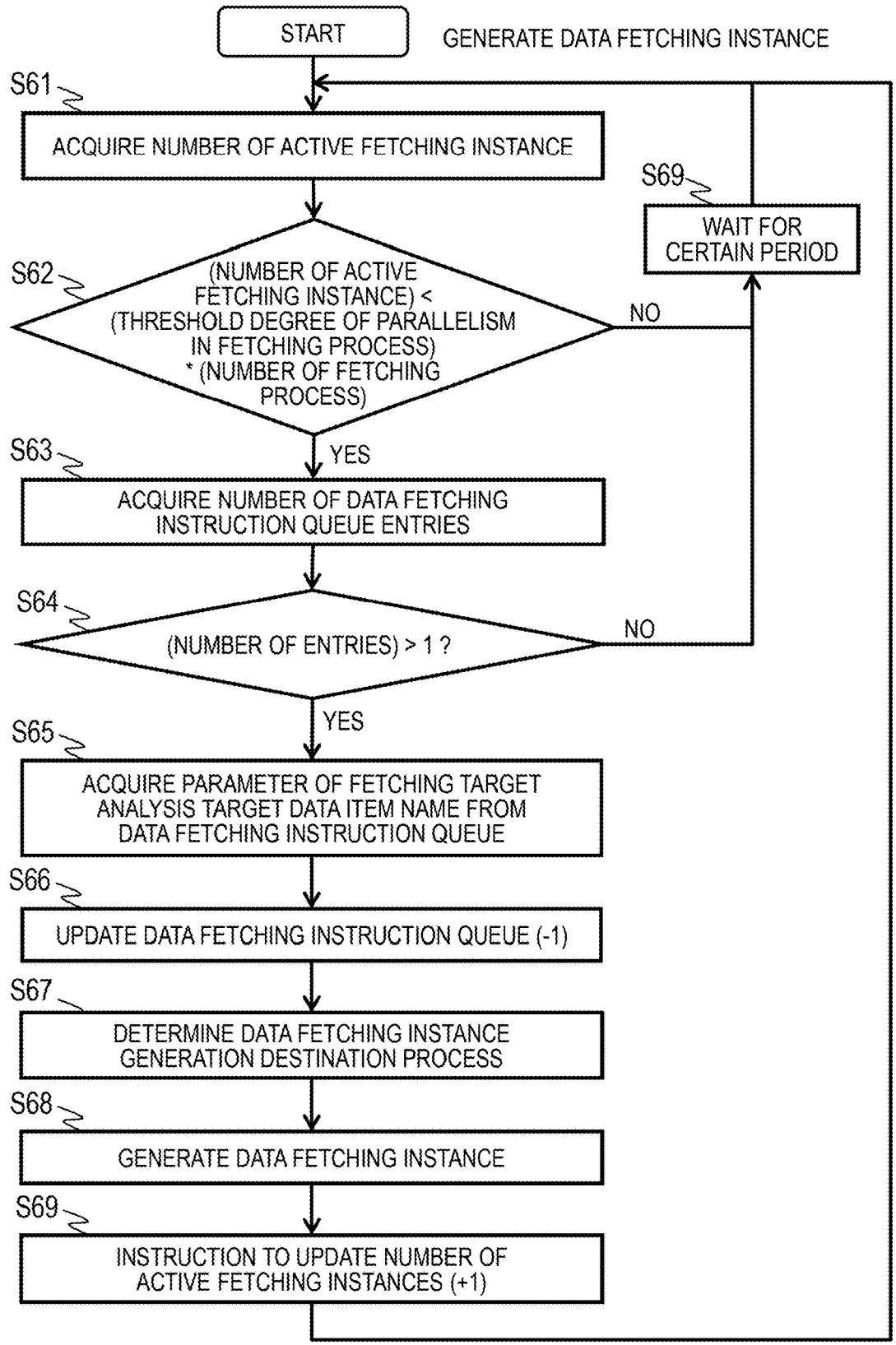
FIG. 13 is a flowchart illustrating an example of a data fetching instance generation process of the analysis server according to the first embodiment of this invention.

FIG. 13 is a flowchart illustrating an example of a data fetching instance generation process of the analysis server 1. This process is performed in step S13 of FIG. 10.

In step S61, the fetching agent 110 acquires the number of fetching instances 141 in activation presently from the number of active fetching instances 61 in the control information 160.

In step S62, the fetching agent 110 determines whether the fetching instance 141 can be added using the computer resources of the analysis server 1. That is, the fetching agent 110 determines whether the number of active fetching instances 61 is smaller than a value (the number of executable fetching instances) obtained by multiplying the number of fetching processes 56 by the threshold degree of parallelism in fetching process 57 indicating the largest value of the number of fetching instances in process.

The flow proceeds to step S63 if the number of active fetching instances 61 is smaller than the multiplication result and the flow proceeds to step S69 if the number of active fetching instances 61 is equal to or larger than the multiplication result. In step S69, a certain period is waited for. After that, the flow returns to step S61, and the above-described process is repeated.

In step S63, the fetching agent 110 acquires the number of entries of the data fetching instruction queue 170. In step S63, the fetching agent 110 compares the number of entries with 1. The flow proceeds to step S65 if the number of entries exceeds 1. The flow proceeds to step S69 and the above-described process is repeated if the number of entries is 1 or smaller.

In step S65, the fetching agent 110 acquires parameters (1701 and 1702) of the fetching target analysis target data item name from the data fetching instruction queue 170. In step S66, the fetching agent 110 clears (−1) the entry of the data fetching instruction queue 170 from which parameters have been acquired and then updates the data fetching instruction queue 170.

Subsequently, in step S67, the fetching agent 110 determines the fetching process 140 serving as an addition target of the fetching instance 141. When the fetching process 140 is determined, a method appropriate for operation of the analysis server 1 such as a Round Robin method or a method of selecting the fetching process 140 in which the number of active fetching instances 141 is the smallest may be used.

Subsequently, in step S68, the fetching agent 110 generates the fetching instance 141 in the addition target fetching process 140 using the parameters acquired in step S65 and executes fetching of the target data.

In step S69, since the fetching agent 110 has generated the fetching instance 141, the fetching agent 110 updates the number of active fetching instances 61 by incrementing (+1) the same.

With the above-described process, when entries are accumulated in the data fetching instruction queue 170 and there is a margin in the number of active instances, a new instance is generated to perform a data fetching process.

<Fetching Instance Ending Determination Process>

Figure 14:
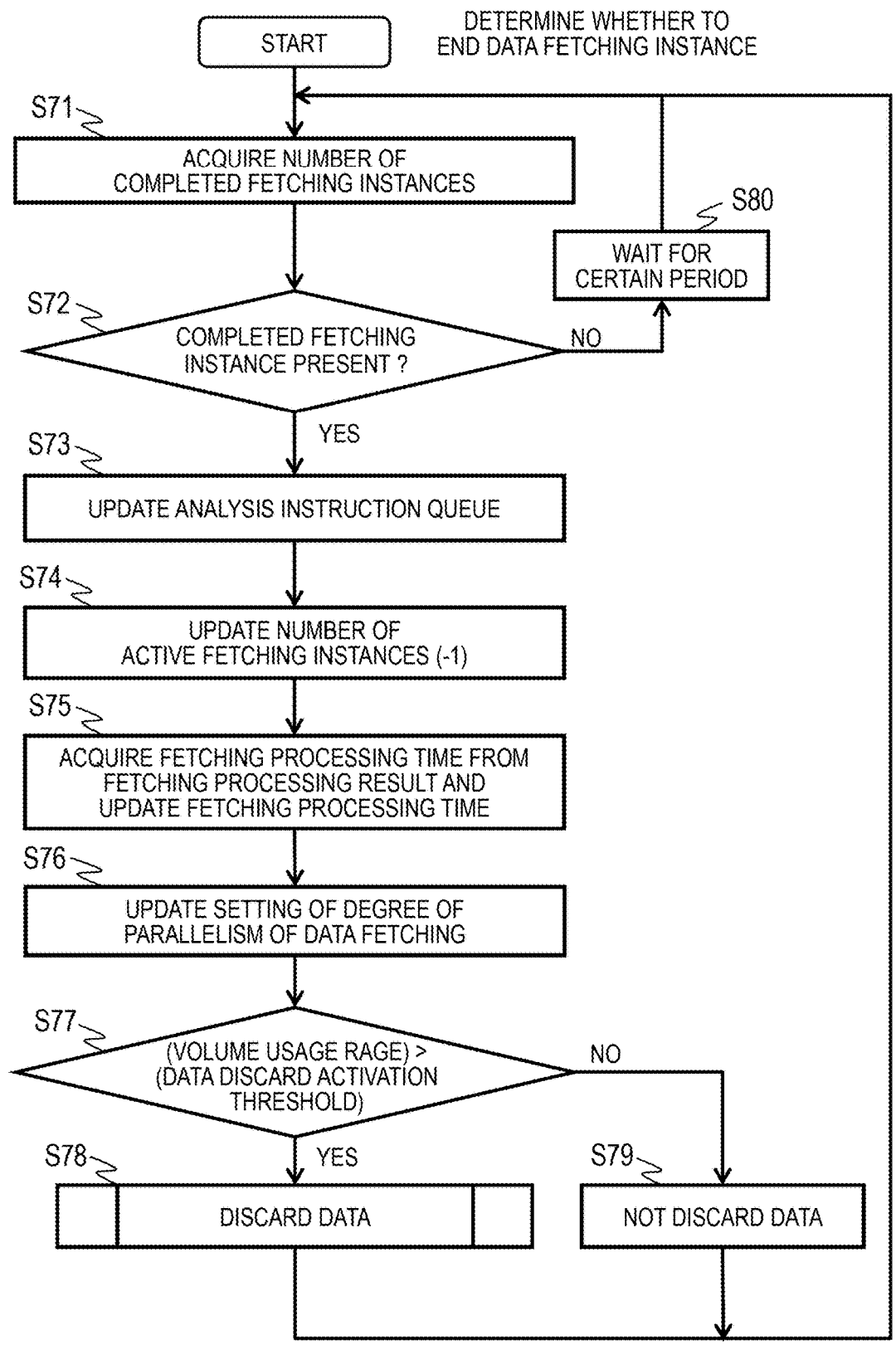
FIG. 14 is a flowchart illustrating an example of a data fetching instance ending determination process of the analysis server according to the first embodiment of this invention.

FIG. 14 is a flowchart illustrating an example of a data fetching instance ending determination process of the analysis server 1. This process is performed in step S14 of FIG. 10.

The fetching instance 141 generated in the process of FIG. 13 outputs information (end information) indicating the end of the process to the memory 12 when the process ends. The end information (not illustrated) includes an execution time of the fetching instance 141 as a fetching process time.

In step S71, the fetching agent 110 acquires the end information from the memory 12 and acquires the number of fetching instances 141 in which the fetching process for fetching data from the data collection server 2 has ended.

In step S72, the fetching agent 110 determines whether the ended fetching instance 141 is present. The flow proceeds to step S72 when the ended fetching instance 141 is present, and the flow proceeds to step S80 if not. In step S80, the fetching agent 110 waits for a certain period. After that, the flow returns to step S71 and the above-described process is repeated.

In step S73, the fetching agent 110 loads the data of the ended fetching instance 141 to an analysis process. That is, the fetching agent 110 adds the parameters (mac and time) of the fetched data 300 acquired by the fetching instance 141 to the data analysis instruction queue 180 to update the data analysis instruction queue 180.

In step S74, since one fetching instance 141 has ended, the number of active fetching instances 61 is updated by being decremented (−1). In step S75, the fetching agent 110 acquires the fetching process time included in the end information to update the fetching process time 63 of the control information 160.

The fetching agent 110 calculates an average value of the fetching process time 63 and the fetching process time included in the end information if the fetching process time 63 is not 0 to update the fetching process time 63. On the other hand, when the fetching process time 63 is 0, the fetching agent 110 sets the fetching process time included in the end information to the fetching process time 63 as it is.

In step S76, since the fetching instance 141 has ended, the fetching agent 110 updates the degree of parallelism in fetching process 55 by decrementing (−1) the same. This process will be described later.

In step S77, the fetching agent 110 determines whether the volume usage rate of the fetched data 300 exceeds the data discard activation threshold 71. The flow proceeds to step S78 if the volume usage rate exceeds the data discard activation threshold 71 and the flow proceeds to step S79 if not.

In step S78, the fetching agent 110 executes a process of discarding the fetched data 300. On the other hand, in step S79, data discarding is not performed. After the above-described process is performed, the flow returns to step S71 and the above-described process is repeated.

With the above-described process, the data acquired by the fetching instance 141 for which a fetching process has ended is loaded into an analysis process, the number of active fetching instances 61 and the fetching process time 63 are updated, and the degree of parallelism in fetching process 55 is updated. Moreover, when the volume usage rate of the storage 15 exceeds the data discard activation threshold 71, the fetched data 300 is discarded, and the volume usage rate of the storage 15 is reduced.

<Analysis Process>

Figure 15:
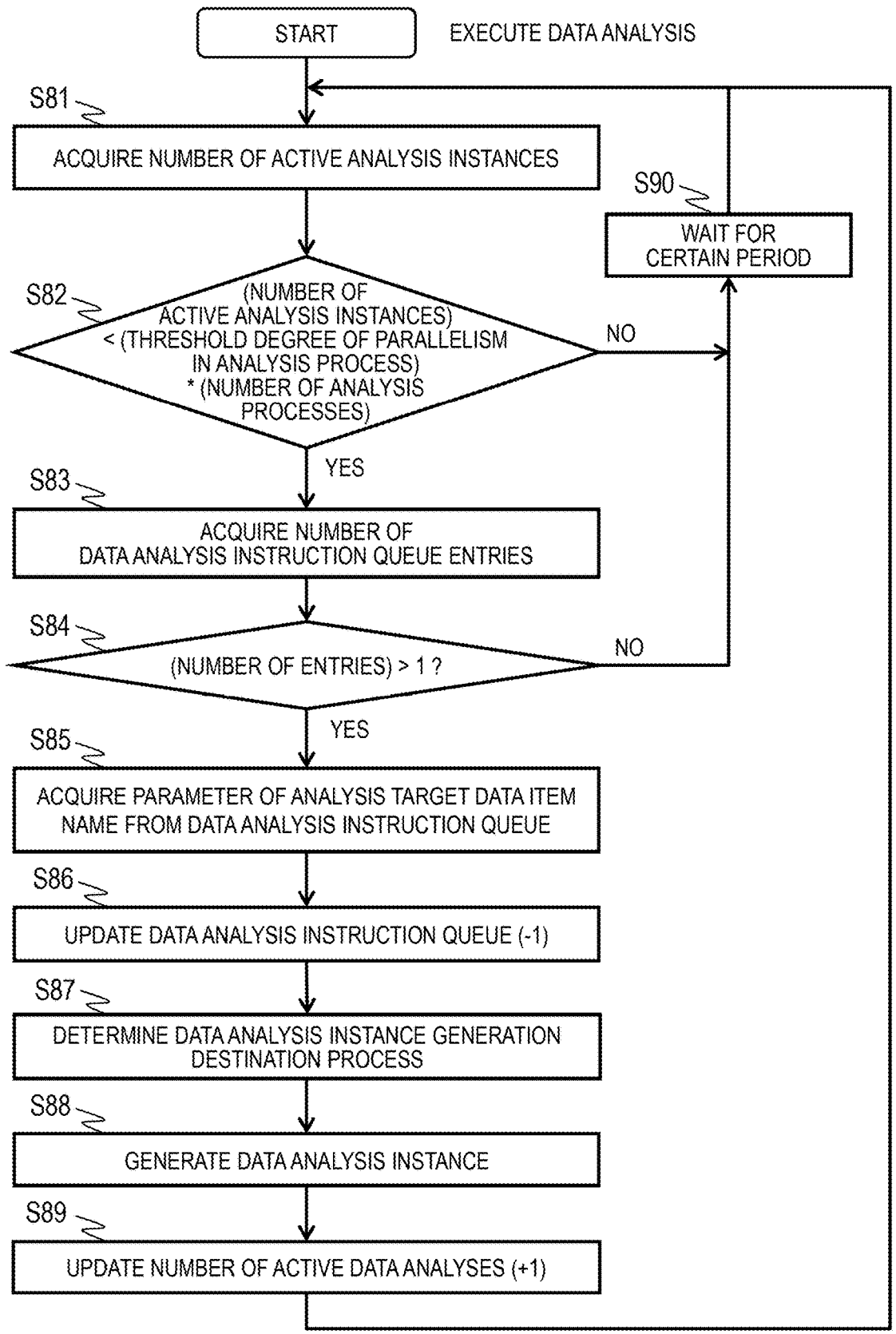
FIG. 15 is a flowchart illustrating an example of a data analysis process of the analysis server according to the first embodiment of this invention.

FIG. 15 is a flowchart illustrating an example of a data analysis process of the analysis server 1. This process is performed in step S15 of FIG. 10.

In step S81, the fetching agent 110 acquires the value of the number of active data analysis instances 62 in the control information 160.

In step S82, the fetching agent 110 determines whether the analysis instance 151 can be added using the computer resources of the analysis server 1. That is, the fetching agent 110 determines whether the number of active data analysis instances 62 is smaller than a value (the number of executable analysis instances) obtained by multiplying the number of analysis processes 59 by the threshold degree of parallelism in analysis process 60 indicating the largest value of the number of analysis instances in process.

The fetching agent 110 proceeds to step S83 if the number of active data analysis instances 62 is smaller than the multiplication result and proceeds to step S89 if the number of active data analysis instances 62 is equal to or larger than the multiplication result. In step S89, the fetching agent 110 waits for a certain process. After that, the flow returns to step S81 and the above-described process is repeated.

In step S83, the fetching agent 110 acquires the number of entries in the data analysis instruction queue 180. In step S84, the fetching agent 110 determines whether the number of entries is larger than 1. The flow proceeds to step S85 if the number of entries is larger than 1 and the flow proceeds to step S89 if the number of entries is 1 or smaller.

In step S85, the fetching agent 110 acquires parameters (1801 and 1802) of the analysis target data item name of the analysis target from the data analysis instruction queue 180. In step S86, the fetching agent 110 clears (−1) the entry of the data analysis instruction queue 180 from which processes have been acquired and updates the data analysis instruction queue 180.

Subsequently, in step S87, the fetching agent 110 determines the analysis process 150 serving as an addition target of the analysis instance 151. When the analysis process 150 is determined, a method appropriate for operation of the analysis server 1 such as a Round Robin method or a method of selecting an analysis process 150 in which the number of active analysis instances 151 is the smallest may be used.

Subsequently, in step S88, the fetching agent 110 generates the analysis instance 151 in the addition target analysis process 150 using the parameters acquired in step S85 and executes analysis of the target data.

In step S88, since the fetching agent 110 has generated the analysis instance 151, the fetching agent 110 updates the number of active data analysis instances 62 by incrementing (+1) the same.

With the above-described process, when entries are accumulated in the data analysis instruction queue 180 and there is a margin in the number of active instances, a new analysis instance 151 is generated to perform an analysis process.

<Analysis Ending Determination Process>

Figure 16:
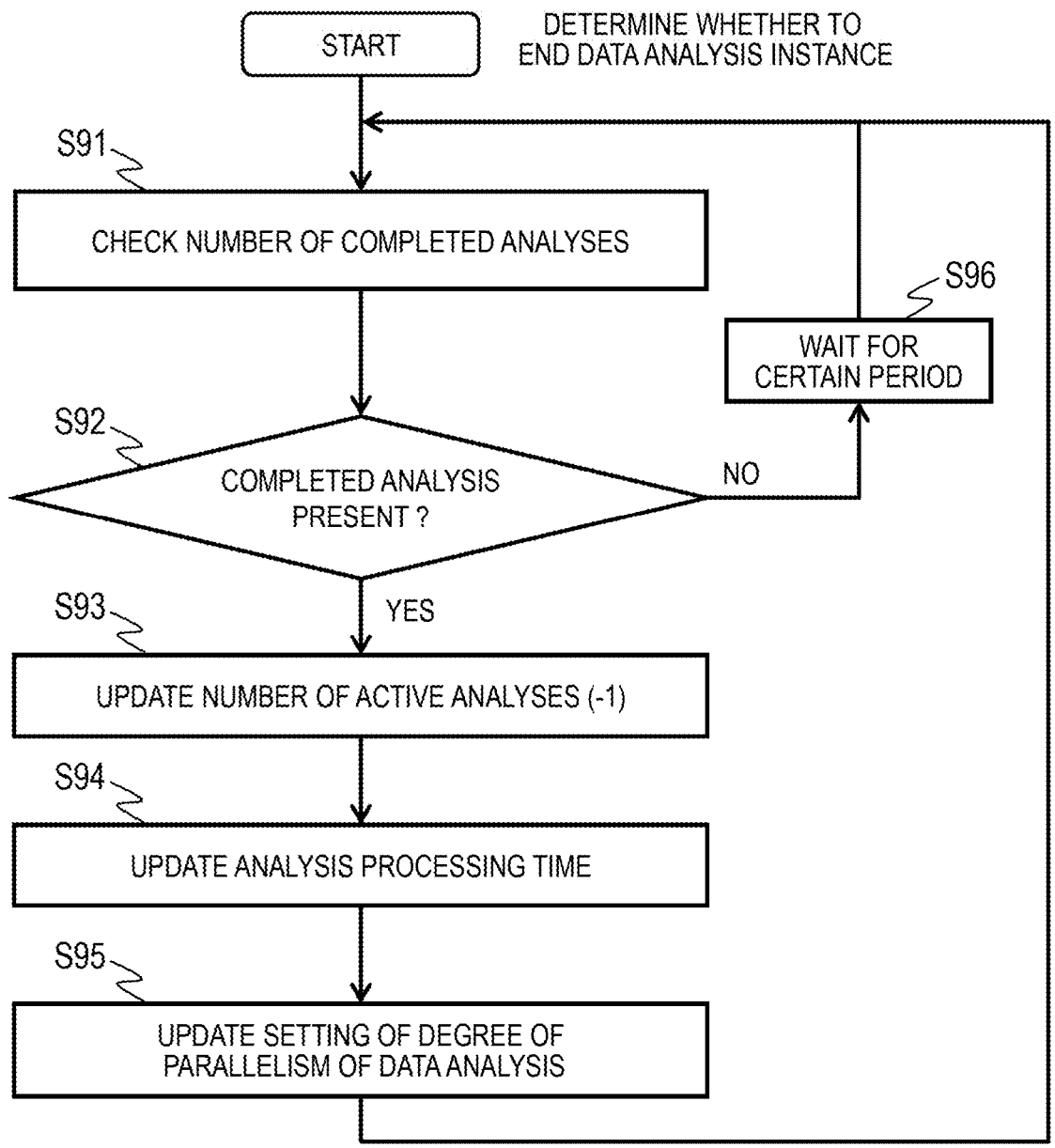
FIG. 16 is a flowchart illustrating an example of a data analysis ending determination process of the analysis server according to the first embodiment of this invention.

FIG. 16 is a flowchart illustrating an example of a data analysis ending determination process of the analysis server 1. This process is performed in step S16 of FIG. 10.

The analysis instance 151 in the analysis process 150 generated in the process of FIG. 15 outputs information (end information) indicating the end of the process to the memory 12 when the process ends. The end information (not illustrated) of the analysis instance 151 includes an execution time of the analysis instance 151 as an analysis process time.

In step S91, the fetching agent 110 acquires the end information from the memory 12 and acquires the number of analysis instances 151 in which the data analysis process has ended.

In step S92, the fetching agent 110 determines whether the ended analysis instance 151 is present. The flow proceeds to step S93 when the ended analysis instance 151 is present, and the flow proceeds to step S96 if not. In step S96, the fetching agent 110 waits for a certain period. After that, the flow returns to step S91 and the above-described process is repeated.

In step S93, since the analysis instance 151 has ended, the fetching agent 110 updates the number of active data analysis instances 62 by decrementing (−1) the same. In step S94, the fetching agent 110 acquires the analysis process time from the end information of the analysis instance 151 and updates the analysis process time 66 of the control information 160.

The fetching agent 110 calculates an average value of the analysis process time 66 and the analysis process time included in the end information if the analysis process time 66 is not 0 to update the analysis process time 66. On the other hand, when the analysis process time 66 is 0, the fetching agent 110 sets the fetching process time included in the end information to the analysis process time 66 as it is.

In step S95, since the analysis instance 151 has ended, the fetching agent 110 updates the degree of parallelism in analysis process 58 by decrementing (−1) the same. This process will be described later. With the above-described process, the number of active data analysis instances 62, the degree of parallelism in analysis process 58, and the analysis process time 66 are updated.

<Degree-of-Parallelism-in-Fetching-Process Updating Process>

Figure 17:
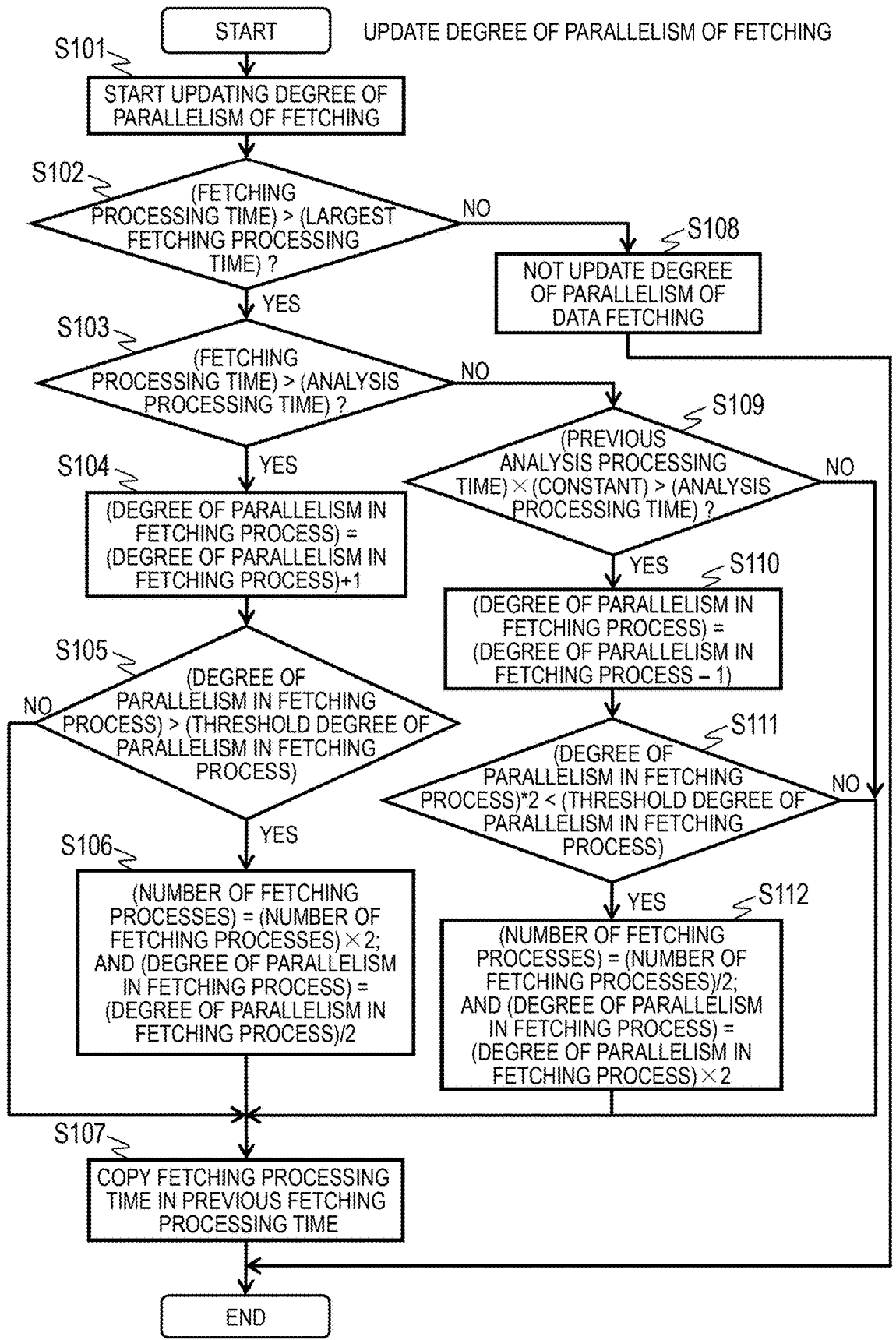
FIG. 17 is a flowchart illustrating an example of a process of updating the degree of parallelism in fetching process of the analysis server according to the first embodiment of this invention.

FIG. 17 is a flowchart illustrating an example of a process of updating the degree of parallelism in fetching process 55 of the analysis server 1. This process is performed in step S17 of FIG. 10.

The fetching agent 110 reads the fetching process time 63 and the largest fetching process time 65 from the control information 160 and starts processing (S101).

Subsequently, in step S102, the fetching agent 110 determines whether the fetching process time 63 exceeds the largest fetching process time 65. The flow proceeds to step S103 if the fetching process time 63 exceeds the largest fetching process time 65, and the flow proceeds to step S108 if the fetching process time 63 is equal to or smaller than the largest fetching process time 65. In step S108, the process ends without updating the degree of parallelism related to the fetching process.

In step S103, the fetching agent 110 reads the analysis process time 66 from the control information 160 and compares the analysis process time 66 with the fetching process time 63. The fetching agent 110 proceeds to step S104 if the fetching process time 63 exceeds the analysis process time 66 and proceeds to step S109 if the fetching process time 63 is equal to or smaller than the analysis process time 66.

In step S104, the fetching agent 110 increments (+1) the degree of parallelism in fetching process 55. In this way, the computer resources to be allocated to the fetching process are increased.

In step S105, the fetching agent 110 compares the degree of parallelism in fetching process 55 updated in step S104 with the threshold degree of parallelism in fetching process 57 set in advance. The fetching agent 110 proceeds to step S106 if the degree of parallelism in fetching process 55 exceeds the threshold degree of parallelism in fetching process 57 and proceeds to step S107 if the degree of parallelism in fetching process 55 is equal to or smaller than the threshold degree of parallelism in fetching process 57.

In step S106, the fetching agent 110 decreases the degree of parallelism in the fetching process 140 since the degree of parallelism in fetching process 55 exceeds a threshold. Due to this, the fetching agent 110 doubles the number of fetching processes 56 and halves the degree of parallelism in fetching process 55.

In step S107, the fetching agent 110 copies the present fetching process time 63 to the previous fetching process time 64 and the process ends.

In the processes of steps S102 to S106, since the fetching process time 63 exceeds the largest fetching process time 65 and the analysis process time 66 is exceeded, the degree of parallelism in fetching process 55 is incremented by 1 and computer resources allocated to the fetching process are increased. However, when the degree of parallelism in fetching process 55 exceeds the threshold degree of parallelism in fetching process 57, the number of fetching processes 56 is doubled and the degree of parallelism in fetching process 55 is halved. In this way, the degree of parallelism in the fetching process 140 is decreased while maintaining the degree of parallelism of the entire fetching process.

On the other hand, in steps later than step S109 when the fetching process time 63 is equal to or smaller than the analysis process time 66, the computer resources allocated to the fetching process are reduced if the present analysis process time 66 exceeds the previous analysis process time 67. Therefore, the flow proceeds to step S110 if the time obtained by multiplying a predetermined constant (>1) by the previous analysis process time 67 exceeds the analysis process time 66 in step S109 and proceeds to step S107 if not.

In step S110, the fetching agent 110 decrements (−1) the degree of parallelism in fetching process 55. In this way, the computer resources to be allocated to the fetching process are decreased.

Subsequently, the flow proceeds to step S112 if the value obtained by doubling the degree of parallelism in fetching process 55 is smaller than the threshold degree of parallelism in fetching process 57 in step S111 and proceeds to step S107 if not. In step S112, the fetching agent 110 halves the number of fetching processes 56 and doubles the degree of parallelism in fetching process 55.

In the processes of steps S109 to S112, the degree of parallelism in fetching process 55 is decremented by 1 and the computer resources to be allocated to the fetching process are reduced. However, when the degree of parallelism in fetching process 55 is sufficiently smaller (½) than the threshold degree of parallelism in fetching process 57, the number of fetching processes 56 is halved and the degree of parallelism in fetching process 55 is doubled.

In this way, the computer resources to be allocated to the fetching process are controlled according to the fetching process time 63 or the analysis process time 66.

<Degree-of-Parallelism-of-Analysis-Process Updating Process>

Figure 18:
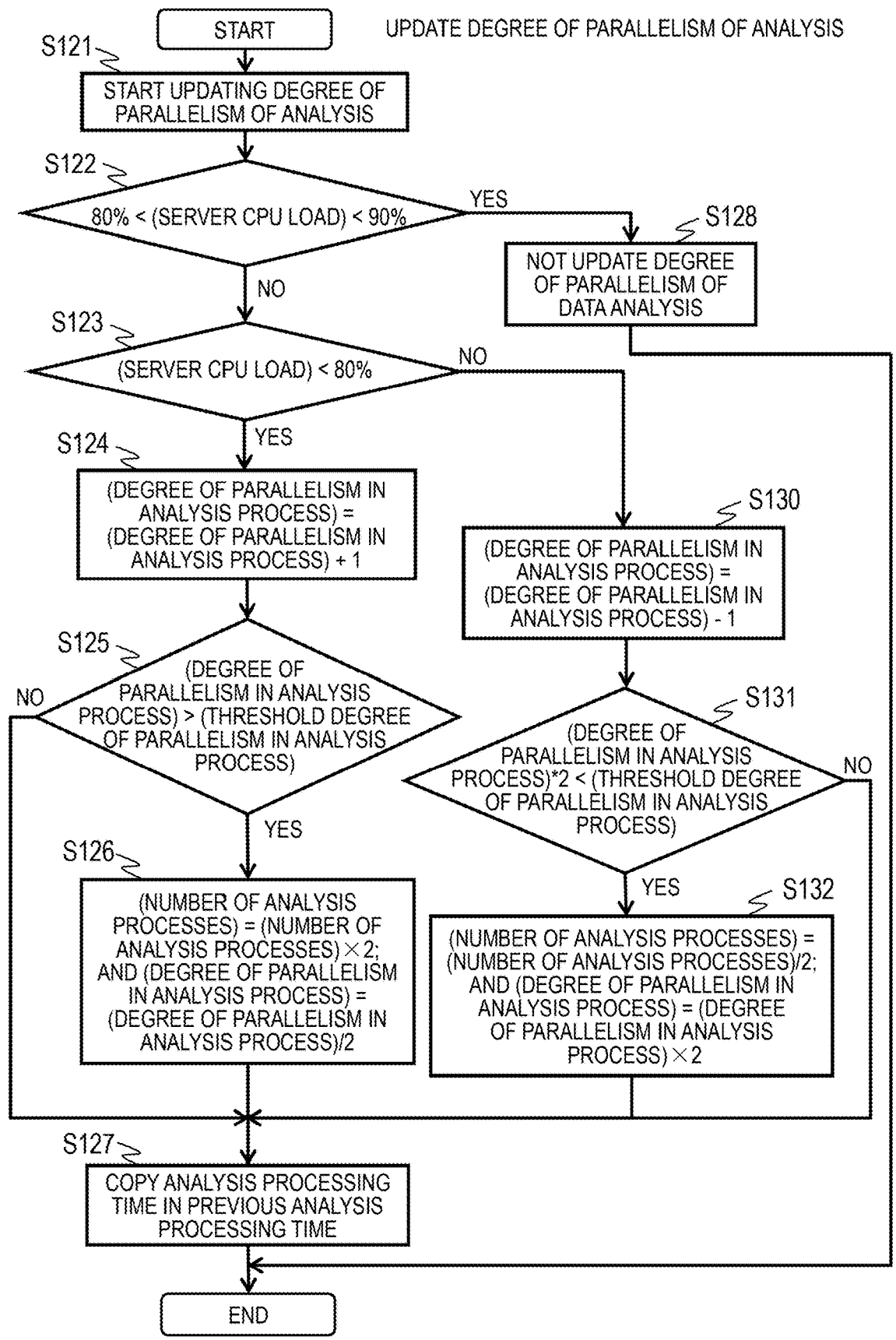
FIG. 18 is a flowchart illustrating an example of a process of updating the degree of parallelism in analysis process of the analysis server according to the first embodiment of this invention.

FIG. 18 is a flowchart illustrating an example of a process of updating the degree of parallelism in analysis process 58 of the analysis server 1. This process is performed in step S18 of FIG. 10.

The fetching agent 110 reads the load of the CPU 11 and starts processing (S121).

Subsequently, in step S122, the fetching agent 110 determines whether the load of the CPU 11 falls within a predetermined range. In the present embodiment, an example in which the range of load is between 80% and 90%.

The fetching agent 10 proceeds to step S108 when the load of the CPU 11 falls within the predetermined range. In step S128, the process ends without updating the degree of parallelism related to an analysis process. On the other hand, the flow proceeds to step S123 if the load of the CPU 11 falls within the predetermined range.

In step S123, the fetching agent 110 deter mines whether the load of the CPU 11 is smaller than a predetermined load threshold. In the present embodiment, an example in which the predetermined load threshold is 80% is illustrated. The fetching agent 110 proceeds to step S124 if the load of the CPU 11 is smaller than the predetermined load threshold. On the other hand, the flow proceeds to step S130 if the load of the CPU 11 is equal to or larger than the predetermined load threshold.

In step S124, the fetching agent 110 increments (+1) the degree of parallelism in analysis process 58. In this way, the computer resources to be allocated to the analysis process are increased.

In step S125, the fetching agent 110 compares the degree of parallelism 58 updated in step S124 and the threshold degree of parallelism in analysis process 60 set in advance. The fetching agent 110 proceeds to step S126 if the degree of parallelism in analysis process 58 exceeds the threshold degree of parallelism in analysis process 60 and proceeds to step S127 if the degree of parallelism in analysis process 58 is equal to or smaller than the threshold degree of parallelism in analysis process 60.

In step S126, the fetching agent 110 decreases the degree of parallelism in the analysis process 150 since the degree of parallelism in analysis process 58 exceeds a threshold. Therefore, the fetching agent 110 doubles the number of analysis processes 59 and halves the degree of parallelism in analysis process 58.

In step S127, the fetching agent 110 copies the present analysis process time 66 to the previous analysis process time 67 and the process ends.

In the processes of steps S122 to S126, since the load of the CPU 11 is smaller than a load threshold, the degree of parallelism in analysis process 58 is incremented by 1 and the computer resources to be allocated to the analysis process are increased. However, when the degree of parallelism in analysis process 58 exceeds the threshold degree of parallelism in analysis process 60, the number of analysis processes 59 is doubled and the degree of parallelism in analysis process 58 is halved. In this way, the degree of parallelism in the analysis process 150 is decreased while maintaining the degree of parallelism of the entire analysis process.

On the other hand, in steps later than step S130 when the load of the CPU 11 exceeds 90% (overload threshold), the computer resources to be allocated to the analysis process are decreased. In step S130, the fetching agent 110 decrements (−1) the degree of parallelism in analysis process 58. In this way, the computer resources to be allocated to the analysis process are decreased.

Subsequently, the flow proceeds to step S132 if a value obtained by doubling the degree of parallelism in analysis process 58 is smaller than the threshold degree of parallelism in analysis process 60 in step S131 and the flow proceeds to step S127 if not. In step S132, the fetching agent 110 halves the number of analysis processes 59 and doubles the degree of parallelism in analysis process 58.

In the processes of steps S130 to S132, the degree of parallelism in analysis process 58 is decreased by 1 and the computer resources to be allocated to the analysis process are decreased. However, when the degree of parallelism in analysis process 58 is sufficiently smaller (½) than the threshold degree of parallelism in analysis process 60, the number of analysis processes 59 is halved and the degree of parallelism in analysis process 58 is doubled.

In this way, the computer resources to be allocated to the analysis process can be controlled according to the load of the CPU 11 of the analysis server 1.

<Initialization Process>

Figure 19:
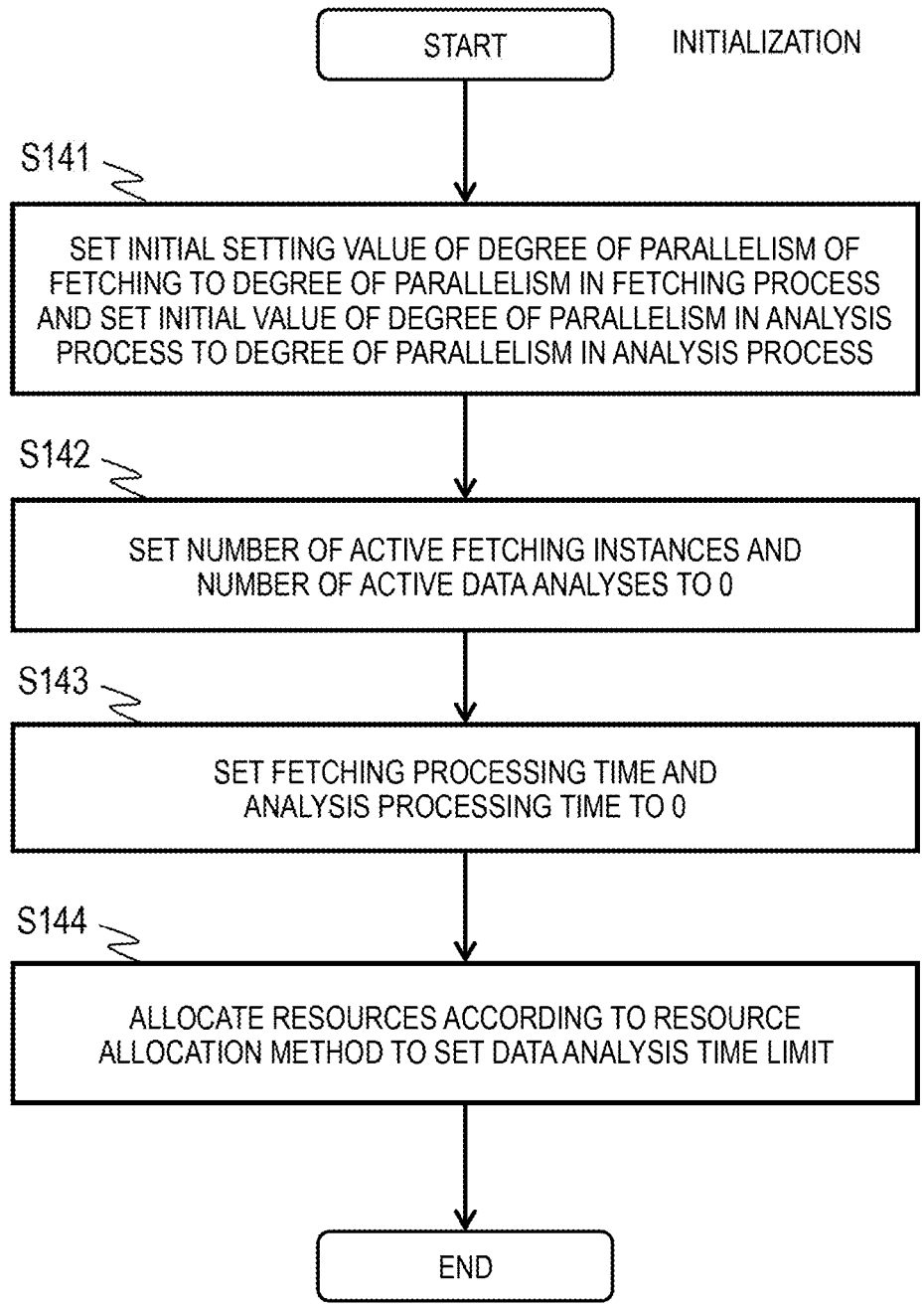
FIG. 19 is a flowchart illustrating an example of an initialization process of the analysis server according to the first embodiment of this invention.

FIG. 19 is a flowchart illustrating an example of an initialization process of the analysis server 1. This process is performed in step S4 of FIG. 9.

In step S141, the fetching agent 110 sets the initial value of degree of parallelism in fetching process 51 to the degree of parallelism in fetching process 55 and sets the initial value of degree of parallelism in analysis process 53 to the degree of parallelism in analysis process 58. Moreover, the fetching agent 110 sets the initial value of number of fetching processes 52 to the number of fetching processes 56 and sets the initial value of number of analysis processes 54 to the number of analysis processes 59.

In step S142, the fetching agent 110 sets the number of active fetching instances 61 to 0 and sets the number of active data analysis instances 62 to 0.

In step S143, the fetching agent 110 sets the fetching process time 63 and the previous fetching process time 64 to 0 and sets the analysis process time 66 and the previous analysis process time 67 to 0.

In step S144, the fetching agent 110 sets the resource allocation method 215 set in the analysis target data fetching designation 201 to the resource allocation method 68 of the control information 160 and sets the data analysis time limit 216 set in the analysis target data fetching designation 201 to the data analysis time limit 69 of the control information 160.

With the above-described process, the fetching agent 110 can start processing according to the analysis target data fetching designation 201.

<Data Discarding Process>

Figure 20:
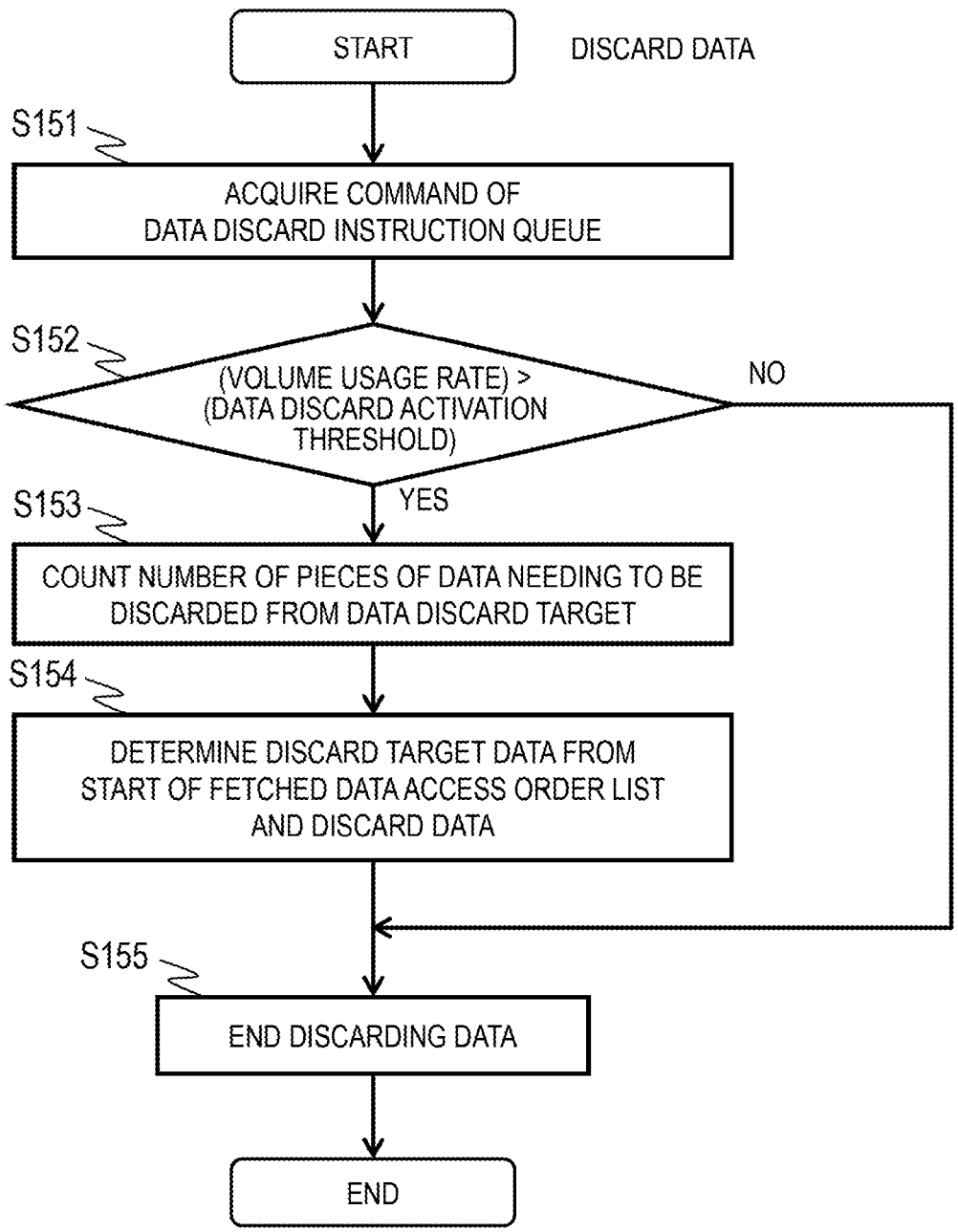
FIG. 20 is a flowchart illustrating an example of a data discarding process of the analysis server according to the first embodiment of this invention.

FIG. 20 is a flowchart illustrating an example of a data discarding process of the analysis server 1. This process is performed in step S49 of FIG. 12.

In step S151, the fetching agent 110 acquires a discard command from the data discard instruction queue 190 and starts processing. In step S152, the fetching agent 110 acquires the volume usage rate of the storage 15 and compares the volume usage rate with the data discard activation threshold 71. The fetching agent 110 proceeds to step S153 if the volume usage rate exceeds the data discard activation threshold 71 and proceeds to step S155 if not and the process ends.

In step S153, the fetching agent 110 acquires the data discard target 72 and counts from the start of the access order list 320 of the fetched data. In step S153, the fetched data 300 is selected until the count of the access order list 320 of the fetched data reaches the data discard target 72 and the selected data is discarded.

With the above-described process, the fetched data 300 is discarded in the order of the access order list 320 of the fetched data, and a vacant volume of the storage 15 can be secured.

CONCLUSION

Figure 21:
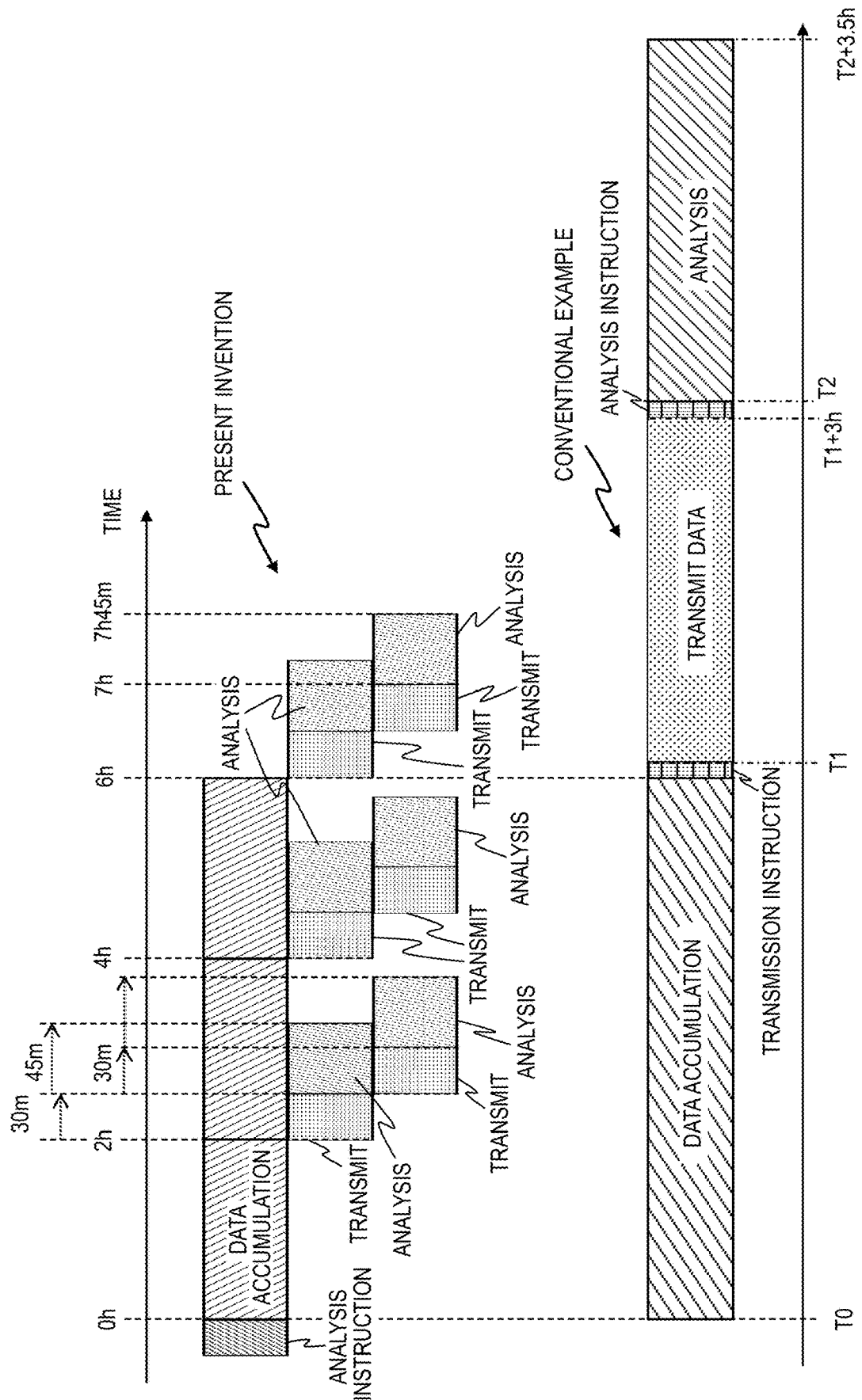
FIG. 21 is a diagram illustrating an example in which the analysis server acquires the sensor data collected by the data collection server and performs an analysis process according to the first embodiment of this invention.

FIG. 21 is a diagram illustrating an example in which the analysis server 1 acquires the sensor data 250 collected by the data collection server 2 and performs an analysis process. An upper part of the drawing illustrates the present invention and a lower part of the drawing illustrates the conventional example. In the illustrated example, the data collection server 2 collects the sensor data 250 in a period of 6 hours from time TO and the analysis server 1 performs fetching and analysis processes using the 6 hours of data as analysis target data.

In the present invention, first, the analysis server 1 outputs the analysis target data fetching designation 210 whereby the data fetching and analysis processes of the analysis server 1 starts from time TO. In the illustrated example, the repetition range 2132 of the fetching data range 213 of the analysis target data fetching designation 210 is 6 hours and the repetition unit 2133 is 2 hours. Moreover, the number of fetching processes 56 and the number of analysis processes 59 are 2. In the illustrated example, each process processes one hour of data.

In the analysis server 1, when 2 hours of data corresponding to the repetition unit 2133 is accumulated in the data collection server 2, the fetching process 140 of the analysis server 1 fetches one hour of data and the analysis process 150 performs analysis when fetching of data is completed. In this example, it is assumed that 30 minutes is taken for the analysis server 1 to fetch one hour of data and 45 minutes is taken for the analysis server 1 to analyze one hour of data.

When 2 hours elapses from time TO, the analysis server 1 fetches 2 hours of data according to the analysis target data fetching designation 210 and starts an analysis process. In the illustrated example, fetching and analysis of data are performed in parallel by two processes. The analysis server 1 completes fetching and analysis of 2 hours of data after one hour and 45 minutes elapses from the fetching of data starts.

In the analysis server 1, the above-described process is performed at time points at which 4 hours and 6 hours have elapsed from time TO, fetching and analysis of the data accumulated for 6 hours are completed after 7 hours and 45 minutes elapses from time TO, and an analysis result is output.

On the other hand, in the conventional example, when 6 hours elapses after the data collection server 2 starts accumulating the sensor data 250, a user instructs the analysis server 1 to fetch 6 hours of sensor data 250.

The analysis server 1 fetches 6 hours of data from the data collection server 2 for 3 hours. After fetching of data is completed, the user inputs an analysis start instruction to the analysis server 1 and the analysis process starts. The analysis server 1 executes an analysis process for 6 hours of data and outputs an analysis result after 3 hours and 30 minutes.

In the conventional example, it is necessary to outputs a transmission instruction and an analysis instruction to the analysis server 1 at timings at which accumulation of data and transmission of data are completed, respectively, and it is difficult to perform an analysis process efficiently depending on the completion timing.

In contrast, in the present invention, the analysis server 1 can automatically perform fetching and analysis of data by designating the fetching data range 213 of repeating fetching and analysis of data in the analysis target data fetching designation 210 of the data collection server 2. Moreover, in the present invention, it is possible to shorten the processing time by performing the data fetching and analysis processes in parallel using a plurality of processes and instances and designating the repetition range in the analysis target data fetching designation 210.

In this way, when a large amount of data is acquired and analyzed, a user of a computer does not have to pay attention to a timing such as a data fetching completion timing and it is possible to acquire an analysis result at a desired timing. Therefore, it is possible to improve operation efficiency remarkably when acquiring and analyzing a large amount of data.

Embodiment 2

Figure 22:
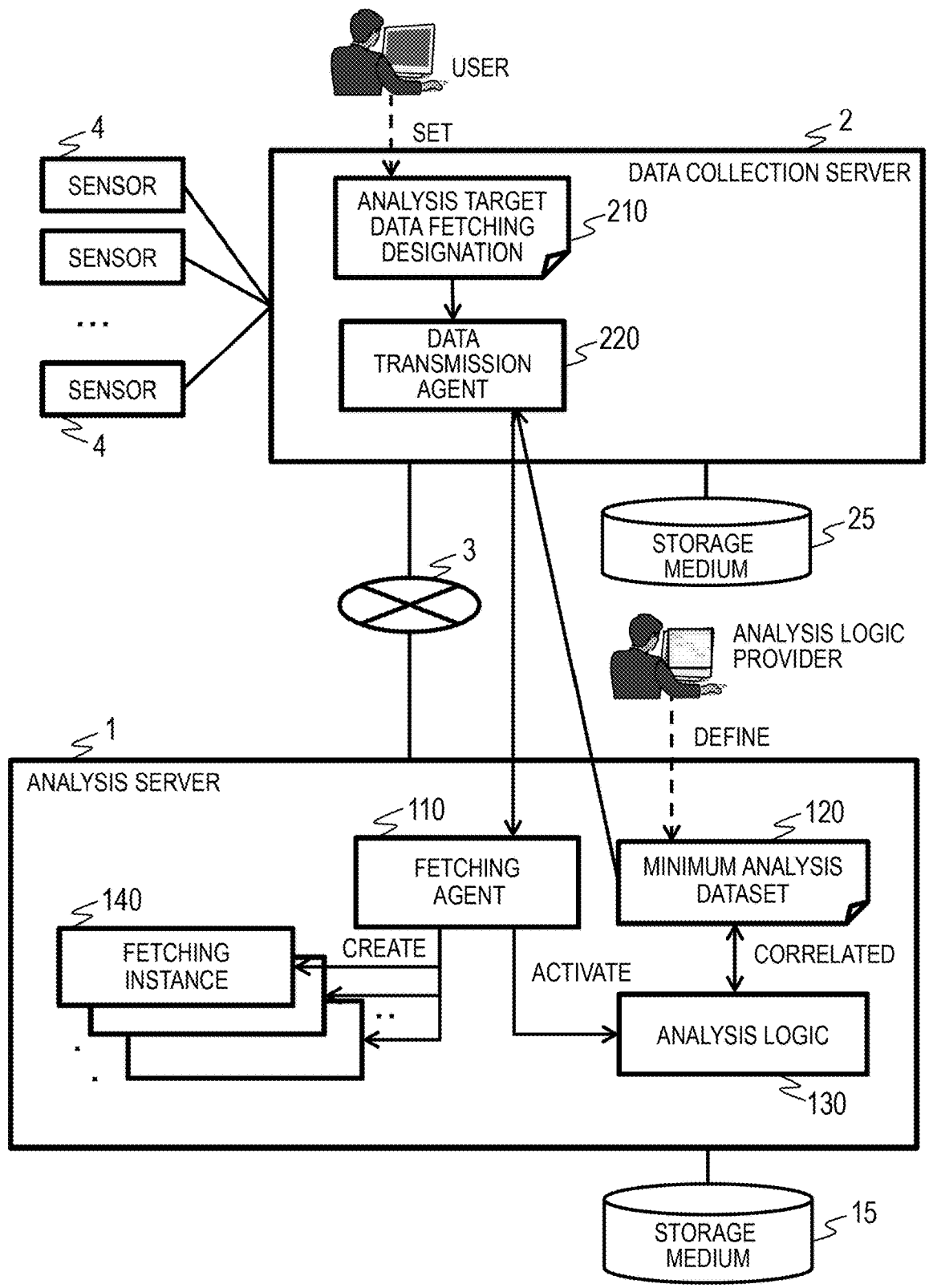
FIG. 22 is a block diagram illustrating an example of functions of a computer system according to a second embodiment of this invention.

FIG. 22 illustrates Embodiment 2 and is a block diagram illustrating an example of functions of a computer system. In Embodiment 1, an example in which the fetching agent 110 of the analysis server 1 controls fetching and analysis of data has been illustrated. In Embodiment 2, an example in which a function of transmitting data is performed by a data transmission agent 220 of the data collection server 2.

The fetching agent 110 of the analysis server 1 of Embodiment 2 does not have a data fetching function unlike Embodiment 1. The data transmission agent 220 of the data collection server 2 has a data transmission function of Embodiment 1. The other configuration is similar to that of Embodiment 1.

The data transmission agent 220 of the data collection server 2 transmits processing target sensor data 250 to the analysis server 1 on the basis of the analysis target data fetching designation 210 and the minimum analysis dataset 120 similarly to Embodiment 1. The data transmission agent 220 generates a transmission process and a transmission instance instead of the fetching process 140 and the fetching instance 141 of Embodiment 1.

In the analysis server 1, the fetching agent 110 executes an analysis process in a predetermined repetition range. The details of the process are similar to those of Embodiment 1, and redundant description will be omitted.

In Embodiment 2, the analysis server 1 can automatically perform acquisition and analysis of data by the data collection server 2 designating the analysis target data fetching designation 210.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

The invention claimed is:
1. A computer system comprising:
a first computer that includes a processor, a memory, and a storage and accumulates data; and a second computer that includes a processor, a memory, and a storage and analyzes data accumulated in the first computer, wherein the second computer includes:
a minimum analysis dataset in which a data item serving as an analysis target and a repetition unit are defined in advance for each analysis target; and
the memory of the second computer storing a computer executable agent program that configures the second computer to operate to:
receive an analysis target data fetching designation including the minimum analysis dataset to use for analysis, a repetition range of repeating acquisition of data, and a repetition unit of repeating acquisition of data,
perform a first process that acquires data from the first computer by performing a first instance of the first process based on the repetition range and the repetition unit included in the analysis target data fetching designation, and
initialize the first instance of the first process to acquire the accumulated data from the first computer, and
when the performing of the first instance of the first process is completed, the agent program configures the second computer to perform a second process by executing an analysis program that configures the second computer to analyze the acquired data by performing a second instance of the second process, activate the second instance of the second program to perform an analysis process when the executing of the first instance of the first program is completed, acquire a data processing time of the first instance of the first program and a data analysis process time of the second instance of the second program and to determine a degree of parallelism of data acquisition of acquiring the data in parallel and a degree of parallelism of data analysis of analyzing the data in parallel on the basis of the data acquisition processing time and the data analysis process time, and increase the degree of parallelism of data acquisition if the data acquisition processing time is larger than the data analysis process time and increases the degree of parallelism of the data analysis when the data analysis process time is larger than a previous data analysis process time.

2. The computer system according to claim 1, wherein the analysis target data fetching designation includes: a correlation between the data item of the minimum analysis dataset and the analysis target data; a correlation between the repetition unit of the minimum analysis dataset and the analysis target data; and access information to the data.

3. The computer system according to claim 2, wherein the agent program further configures the second computer to accumulate meta information of data acquired from the first computer, determines whether acquisition target data included in the analysis target data fetching designation is included in the meta information, and acquires data other than the data included in the meta information from the first computer.

4. The computer system according to claim 1, wherein the agent program further configures the second computer to acquire a processing load of a processor of the second computer and changes the degree of parallelism of data analysis according to the processing load of the processor of the second computer.

5. A data analysis method of analyzing data using a first computer that includes a processor, a memory, and a storage and accumulates data and a second computer that includes a processor, a memory including a minimum analysis data set in which a data item corresponding to an analysis target and a repetition unit are defined in advance for each analysis target, and a storage and analyzes data accumulated in the first computer, the method comprising:

allowing the second computer to receive an analysis target data fetching designation including the minimum analysis dataset to use for analysis, a repetition range of repeating acquisition of data, and a repetition unit of repeating acquisition of data;

allowing the second computer to perform a first process that acquires data from the first computer by executing a first instance of a first program based on the repetition range and the repetition unit included in the analysis target data fetching designation, and activate the first instance of the first program to acquire the accumulated data from the first computer, allowing the second computer to perform a second process that analyzes the acquired data by executing a second instance of a second program when the executing of the first instance of the first program is completed initiate the second instance of the second program to perform an analysis process acquire a data acquisition processing time of the first instance of the first program and a data analysis process time of the second instance of the second program and to determine a degree of parallelism of data acquisition of acquiring the data in parallel and a degree of parallelism of data analysis of analyzing the data in parallel on a basis of the data acquisition processing time and the data analysis process time; and increase the degree of parallelism of data acquisition if the data acquisition processing time is larger than the data analysis process time and increases the degree of parallelism of data analysis when the data analysis process time is larger than a previous data analysis process time.

6. The data analysis method according to claim 5, wherein the analysis target data fetching designation includes:

a correlation between the data item of the minimum analysis dataset and the analysis target data;

a correlation between the repetition unit of the minimum analysis dataset and the analysis target data; and access information to the data.

7. The data analysis method according to claim 6, further comprising: accumulating meta information of data acquired from the first computer, determining whether acquisition target data included in the analysis target data fetching designation is included in the meta information, and acquiring data other than the data included in the meta information from the first computer.

8. The data analysis method according to claim 5, further comprising: acquiring a processing load of a processor of the second computer and changing the degree of parallelism of data analysis according to the processing load of the processor of the second computer.

* * * * *